United States Patent
Suginouchi et al.

(10) Patent No.: US 8,090,547 B2
(45) Date of Patent: *Jan. 3, 2012

(54) ULTRASONIC MEASURING DEVICE AND ULTRASONIC MEASURING METHOD

(75) Inventors: Takehiko Suginouchi, Kanagawa (JP); Yong Wang, Hyogo (JP); Masahiko Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 261 days.

This patent is subject to a terminal disclaimer.

(21) Appl. No.: 12/517,377

(22) PCT Filed: Sep. 29, 2008

(86) PCT No.: PCT/JP2008/002710
§ 371 (c)(1),
(2), (4) Date: Jun. 3, 2009

(87) PCT Pub. No.: WO2009/044528
PCT Pub. Date: Apr. 9, 2009

(65) Prior Publication Data
US 2010/0049452 A1    Feb. 25, 2010

(30) Foreign Application Priority Data
Oct. 1, 2007   (JP) ................. 2007-257865

(51) Int. Cl.
  *G01N 29/00* (2006.01)
  *G06F 19/00* (2006.01)
(52) U.S. Cl. ............... 702/56; 73/597; 73/602; 702/159
(58) Field of Classification Search .................. None
  See application file for complete search history.

(56) References Cited

U.S. PATENT DOCUMENTS 5,224,120 A * 6/1993 Schilling ................ 375/130
(Continued)

FOREIGN PATENT DOCUMENTS

JP       07-303092       11/1995
(Continued)

OTHER PUBLICATIONS

International Search Report for corresponding application No. PCT/JP2008/002710 mailed Nov. 25, 2008.
(Continued)

*Primary Examiner* — Sujoy Kundu
*Assistant Examiner* — Haidong Zhang
(74) *Attorney, Agent, or Firm* — Renner, Otto, Boisselle & Sklar, LLP

(57) ABSTRACT

An ultrasonic measurement method, including: receiving a plurality of ultrasonic waves that have been spectrum-spread with different codes by first and second wave-receivers; de-spreading the first and second receive signals respectively with a selected code and a non-selected code; obtaining an amplitude ratio between the produced selected de-spread signal and the non-selected de-spread signal; determining a threshold value based on the amplitude ratio; extracting a signal having an amplitude greater than or equal to the threshold value from the non-selected de-spread signal to thereby produce an interfering signal; spreading the interfering signal with a corresponding non-selected code and then removing the interfering signal from the first and second receive signals to thereby produce first and second receive signals from which the interfering signal has been removed; de-spreading the first and second receive signals from which the interfering signal has been removed each with the selected code to thereby obtain first and second de-spread signals from which the interfering signal has been removed; and calculating the propagation distance and the propagation direction of the selected ultrasonic wave based on points in time at which the first and second de-spread signals arrive at the first and second wave-receivers.

13 Claims, 18 Drawing Sheets

U.S. PATENT DOCUMENTS

| | | | |
|---|---|---|---|
| 5,579,304 A | 11/1996 | Sugimoto et al. | |
| 5,956,333 A | 9/1999 | Zhou et al. | |
| 6,222,498 B1 | 4/2001 | Ishii et al. | |
| 6,778,592 B1 | 8/2004 | Haga et al. | |
| 7,617,731 B2 * | 11/2009 | Suginouchi et al. | 73/602 |
| 2002/0090025 A1 * | 7/2002 | Kober et al. | 375/148 |
| 2002/0136278 A1 * | 9/2002 | Nakamura et al. | 375/148 |
| 2002/0155812 A1 | 10/2002 | Takada | |
| 2004/0131134 A1 | 7/2004 | Hiroyasu | |
| 2006/0176973 A1 * | 8/2006 | Alamouti et al. | 375/267 |
| 2006/0240826 A1 * | 10/2006 | Shinozaki | 455/436 |

FOREIGN PATENT DOCUMENTS

| | | |
|---|---|---|
| JP | 09-200179 | 7/1997 |
| JP | 11-088230 | 3/1999 |
| JP | 11-205286 | 7/1999 |
| JP | 2000-261412 | 9/2000 |
| JP | 2000-353981 | 12/2000 |
| JP | 2002-271234 | 9/2002 |
| JP | 2002-353866 | 12/2002 |
| JP | 3476987 | 9/2003 |
| JP | 2004-108826 | 4/2004 |
| WO | 2008/010306 | 1/2008 |

OTHER PUBLICATIONS

Wang et al.; "Estimation of Travel Time Using the New Measurement Technique for Long-range Transmission"; Japanese Journal of Applied Physics; vol. 43, No. 5B; 2004; pp. 3169-3175.

* cited by examiner

FIG.16
(a)
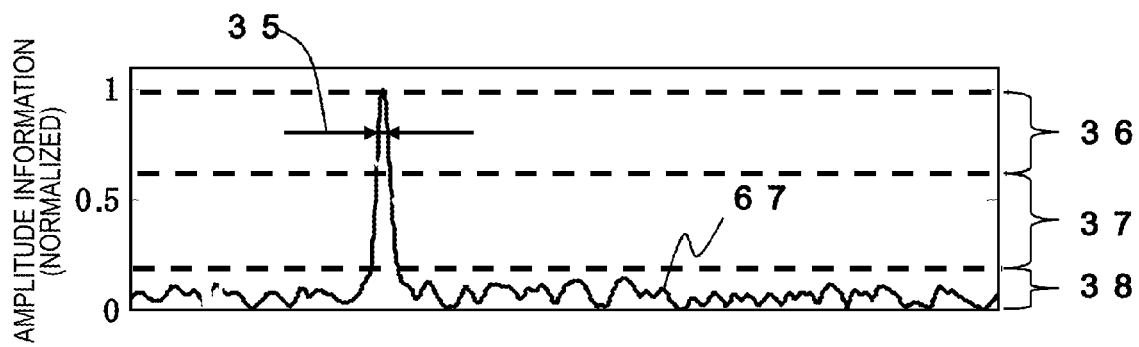
(b)
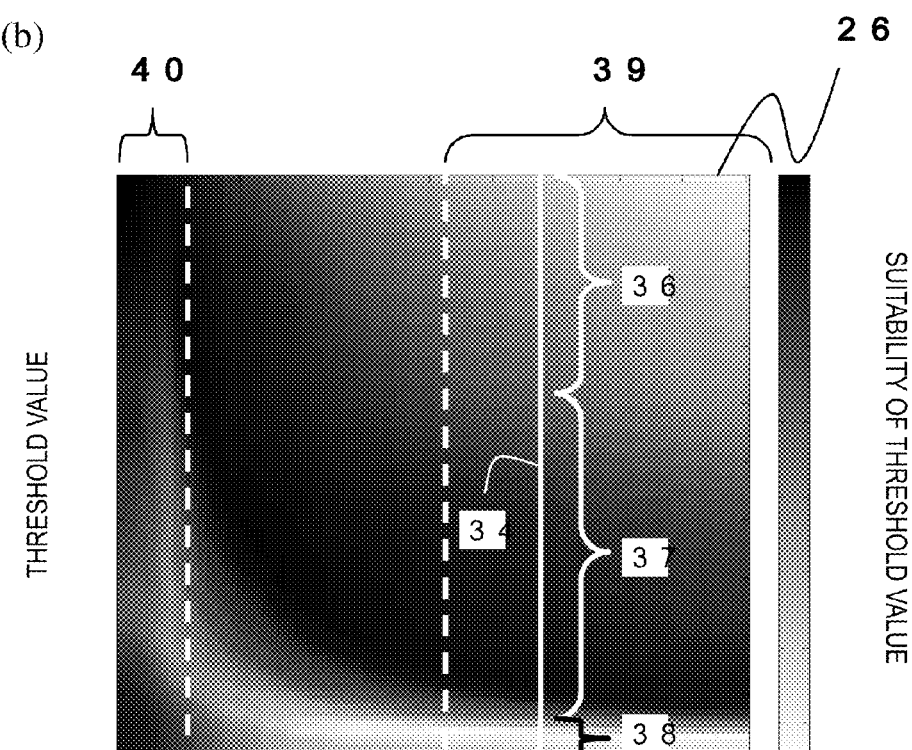
AMPLITUDE RATIO BETWEEN S2 SIGNAL/S1 SIGNAL FIG.21
(a)
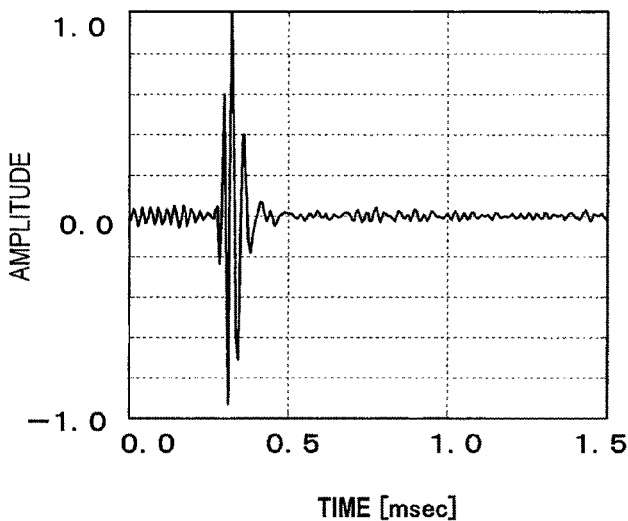
(b)
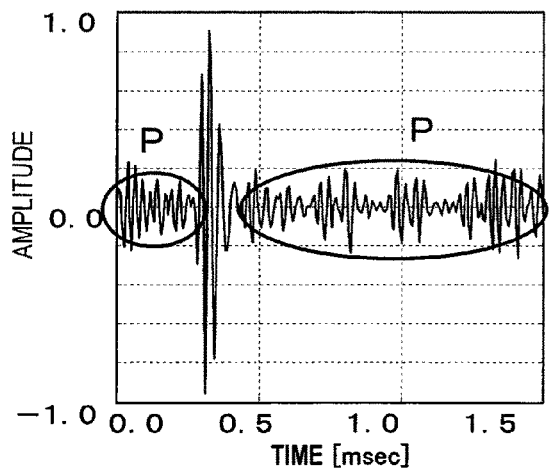
(c)
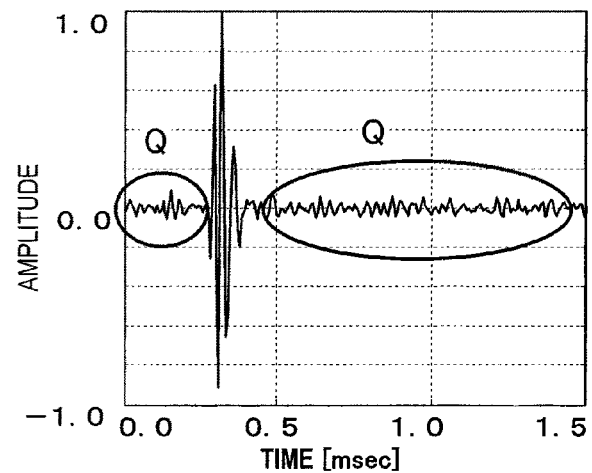

ULTRASONIC MEASURING DEVICE AND ULTRASONIC MEASURING METHOD

TECHNICAL FIELD

The present invention relates to a measurement device and a measurement method using ultrasonic waves. Particularly, the present invention relates to a measurement device and a measurement method, which are capable of correctly measuring the propagation distance or the propagation direction of an ultrasonic wave in an environment where a plurality of ultrasonic signals may interfere with one another.

BACKGROUND ART

An ultrasonic measurement device includes a wave-transmitter for transmitting an ultrasonic wave and a wave-receiver for receiving an ultrasonic wave, and measures the distance between the wave-transmitter and the wave-receiver based on the amount of time required until the wave-receiver receives the ultrasonic wave after the transmission of the ultrasonic wave by the wave-transmitter. Alternatively, an ultrasonic measurement device measures the distance between an object and the ultrasonic measurement device based on the amount of time required until an ultrasonic wave transmitted from the wave-transmitter reaches the object and the ultrasonic wave reflected by the object is received by the wave-receiver after the transmission of the ultrasonic wave by the wave-transmitter.

In an environment where there are a plurality of such ultrasonic measurement devices, if ultrasonic waves are simultaneously transmitted from different ultrasonic measurement devices, the ultrasonic waves may interfere with one another, thus resulting in erroneous measurement. In view of this, a possible approach is to prevent interference between ultrasonic waves by shifting the timing of ultrasonic wave transmission of each ultrasonic measurement device from those of others (time division transmission).

However, where ultrasonic measurement devices are operating independently of one another, it is not possible to control the timings of ultrasonic signal transmission of different ultrasonic measurement devices so that no interference occurs. In view of this, methods have been devised in which ultrasonic waves are distinguished from one another by encoding, with different codes, ultrasonic waves used by ultrasonic measurement devices.

In view of demodulating and taking out the code of an intended signal from among signals interfering with one another, it is preferred that the other signals are not at all similar to the intended signal. A random signal having such a characteristic that is artificially produced based on a certain rule is called a pseudo-random signal. Binary signals ("1"s and "0"s) are often used for the ease of handling, and pseudo-random signals such as an M-sequence, a Barker sequence and a Golay sequence are known in the art.

An M-sequence, among others, is a code that is used in communications systems using a spread spectrum technique, i.e., a code that serves as a distinguishable, noise-like carrier for information being transferred. This is very effective in taking out an intended signal because between different M-sequences, other signals appear only as noise with respect to the intended signal. Moreover, where signals are both intended signals, if the time of one signal is shifted at all from that of the other signal, they appear only as noise, and it is believed that it is thus possible to know at which point in time an intended signal is present along a sequence of time of interfering receive signals.

Therefore, it is believed that also with ultrasonic measurement devices, by transmitting/receiving ultrasonic waves using an M-sequence pseudo-random signal, each ultrasonic measurement device can perform accurate measurement without being influenced by ultrasonic waves transmitted from other ultrasonic measurement devices, even in a case where ultrasonic measurement devices are operating independently of one another.

Patent Document 1 discloses an ultrasonic measurement device using such an M-sequence pseudo-random signal. Specifically, an M-sequence pseudo-random signal is transmitted on an ultrasonic wave, and a receive signal is obtained by receiving the ultrasonic wave having been reflected by the measurement object. By obtaining the correlation between the pseudo-random signal shifted from the transmission time by a predetermined time interval and the receive signal, the point in time at which the correlation value peaks is obtained as the arrival time of the ultrasonic wave. As the amount of time from the transmission time to the arrival time is the propagation time of the ultrasonic wave, it is possible to obtain the distance to the measurement object based on the propagation speed of the ultrasonic wave.

As described above, between M-sequences, other signals appear only as noise with respect to the intended signal, and therefore there is a very small correlation with a receive signal of an ultrasonic wave transmitted from another ultrasonic measurement device. Thus, no peak is detected in the correlation value, and it is possible to distinguish the pseudo-random signal obtained from the other ultrasonic measurement device.

However, even if encoding is performed using M-sequence discretization, the interference due to cross-correlation increases if the amount of overlap with the ultrasonic wave transmitted from another ultrasonic measurement device increases. If the interference increases, the peak value of the correlation value becomes gentle, and it is no longer possible to determine the accurate ultrasonic wave reception time. As a result, it may be no longer possible to perform accurate distance measurement. If the amount of overlap with the ultrasonic wave transmitted from another ultrasonic measurement device becomes excessively large, it may be no longer possible to obtain the peak value of the correlation value, failing to perform the measurement at all. Moreover, in a case where the energy of the ultrasonic wave transmitted from another ultrasonic measurement device is larger, the peak of the correlation value also becomes vague, and it may be no longer possible to obtain a clear peak.

In the field of radio waves, there is a known method in which the interference is removed by subtracting signals other than the signal of interest from the receive signal in advance so as to realize desirable communications even in such an environment where many of a plurality of radio wave signals interfere with one another.

Patent Document 2 discloses a mobile telephone base station receiver using such an interference preventing technique. The receiver of Patent Document 2 accommodates N (N is a natural number) users, and is capable of removing interference with signals from all users. Referring now to FIG. 22, an example where the signal of user A is taken out from among three users A, B and C will be described.

As shown in FIG. 22, a receiver 80 includes de-spreading sections 22(1) and 22(2) including complex matched filters, demodulation sections 23(1) and 23(2) for obtaining the power of the signal, amplitude ratio section 25(1) and 25(2) for determining the voltage value (threshold value) of a predetermined ratio from the power, extraction sections 27(1) and 27(2) for extracting the waveform using the threshold value, re-spreading sections 28(1) and 28(2), a delay section 30, and a de-spreading section 31. The demodulation section 23(1), the amplitude ratio section 25(1) and the extraction section 27(1) are referred to as a main wave extraction section, and the demodulation section 23(2), the amplitude ratio section 25(2) and the extraction section 27(2) are referred to as a main wave extraction section.

A signal that has been spread with a different code is transmitted from each user (transmitter). Spreading is to temporally expand the information being transmitted ("1" or "0") using a pseudo-random code such as an M-sequence code. The spread information is transmitted on a sinusoidal wave called a carrier. Different phases (e.g., 0 degree and 180 degrees) or frequencies of the sinusoidal wave correspond to "1"s and "0"s of the encoded signal.

In the de-spreading sections 22(1) and 22(2), the receive signal is subjected to a de-spreading process with codes of users B and C other than user A, which is to be extracted. The de-spreading process is a process in which information that has been temporally widened by a spreading process is brought back to the original by a correlation process with the corresponding pseudo-random signal.

The de-spreading section 22(1) de-spreads the receive signal with the code of user B, and the de-spreading section 22(2) de-spreads the receive signal with the code of user C. The signal produced by de-spreading is a sinusoidal wave corresponding to information transmitted by user B and user C. The sinusoidal wave has received distortion along the propagation path, and also contains thermal noise. Therefore, one cannot know from which point to which point in time is the sinusoidal wave corresponding to the information that has actually been transmitted. Moreover, the propagation path to the base station receiver 80 from the position of user B is different from that from the position of user C.

Thus, a threshold value process for the produced signal is performed by the main wave extraction section. The threshold value process is to extract, from the de-spread signal, a signal greater than or equal to a predetermined ratio with respect to the maximum power of the signal.

Specifically, the demodulation section 23(1) obtains the power (amplitude) information of the de-spread signal obtained from the de-spreading section 22(1). The amplitude ratio section 25(1) obtains the maximum power from the power information, and obtains a voltage value (threshold value) by multiplying the maximum power by a predetermined ratio. The extraction section 27(1) extracts, from the de-spread signal, a signal greater than or equal to the threshold value by the de-spreading section 22(1). The extracted signal is subjected to a spreading process by the re-spreading section 28(1). The thermal noise component is removed by the threshold value process, but the distortion along the propagation path is retained. Therefore, the re-spread signal is a signal obtained by taking into account the profile of the propagation path along which the transmit signal of user B has propagated. Similarly, the transmit signal transmitted by user C is obtained.

An adder 29 subtracts, from the receive signal, the transmit signal of user B and the transmit signal of user C, which are obtained by re-spreading. At this time, the delay section 30 delays the receive signal until signals are output from the re-spreading sections 28(1) and 28(2).

By de-spreading the signal obtained as described above by the de-spreading section 31 using the code of user A, it is possible to suppress interference due to cross-correlation with transmit signals from users B and C, and to obtain a de-spread signal of a high quality.

Patent Document 3 also discloses a mobile telephone base station receiver using such an interference preventing technique as described above. According to Patent Document 3, the base station receiver, which accommodates N users, processes the receive signal with N matched filters, subjects the output to a threshold value process to thereby extract an output greater than or equal to a predetermined level, re-spreads the extracted output with a corresponding spreading code, delays the receive signal so that the receive signal and the re-spread signal are synchronized with each other, and subtracts the re-spread signal from the delayed receive signal to thereby extract the signal from the intended user.

[Patent Document 1] Japanese Laid-Open Patent Publication No. 2004-108826
[Patent Document 2] Japanese Patent No. 3476987
[Patent Document 3] Japanese Laid-Open Patent Publication No. 9-200179

DISCLOSURE OF INVENTION

Problems to be Solved by the Invention

Patent Documents 2 and 3 are techniques used for a mobile telephone base station receiver, and the relative movement of the user using a mobile telephone is small with respect to the wide area covered by the base station. Therefore, the amplitude variations of the receive signal of the user to be taken out and the receive signals of the other users are small. That is, the change in the maximum power, which is the reference of evaluation of the threshold value, is relatively small.

However, with ultrasonic measurement devices, the moving speed of the measurement object, which is a reflector or an autonomous vehicle, is high with respect to the range of measurement of the ultrasonic measurement device, and therefore the profile of the propagation path varies substantially within a short period of time depending on the environment. Therefore, it is necessary to change the threshold value for each measurement, and the amount of such a change is large. According to the technique disclosed in Patent Document 2, it is not possible to suitably address such problems that are characteristic of ultrasonic measurement devices.

An objective of the present invention is to solve such problems in the prior art, and to provide an ultrasonic measurement device and an ultrasonic measurement method, which are capable of performing measurement of high precision in an environment where there are a plurality of ultrasonic measurement devices.

Means for Solving the Problems

An ultrasonic measurement method of the present invention is an ultrasonic measurement method for measuring at least one of a propagation distance and a propagation direction of a selected ultrasonic wave among a plurality of ultrasonic waves that have been spectrum-spread with different codes, including: a step (A) of receiving the plurality of ultrasonic waves that have been spectrum-spread with different codes by first and second wave-receivers to produce first and second receive signals; a step (B) of de-spreading the first and second receive signals respectively with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal for the first and second receive signals, respectively; a step (C) of obtaining an amplitude ratio between the selected de-spread signal and the at least one non-selected de-spread signal for each of the first and second receive signals; a step (D) of determining at least one threshold value based on the amplitude ratio for each of the first and second receive signals; a step (E) of extracting a signal having an amplitude greater than or equal to the threshold value from the at least one non-selected de-spread signal by using the threshold value for each of the first and second receive signals to thereby produce at least one interfering signal; a step (F) of, for each of the first and second receive signals, spreading the at least one interfering signal with a corresponding non-selected code and then removing the at least one interfering signal from the first and second receive signals to thereby produce first and second receive signals from which the interfering signal has been removed; a step (G) of de-spreading the first and second receive signals from which the interfering signal has been removed each with the selected code to thereby obtain first and second de-spread signals from which the interfering signal has been removed; and a step (H) of calculating at least one of the propagation distance and the propagation direction of the selected ultrasonic wave based on points in time at which the first and second de-spread signals from which the interfering signal has been removed arrive at the first and second wave-receivers, wherein the step (D) includes obtaining in advance a relationship between a threshold value and the amplitude ratio such that an S/N ratio of the receive signal from which the interfering signal has been removed is greater than or equal to a predetermined value, and determining a threshold value for an amplitude ratio based on the relationship obtained in advance.

In a preferred embodiment, the step (E) includes extracting a signal having an amplitude greater than or equal to the threshold value based on normalized amplitude information of the at least one non-selected de-spread signal; and the relationship is as follows:

$y=1 (0<x<0.3)$ $1>y\geq 0.4 (0.3\leq x\leq 0.7)$ $y\geq -x/3+0.6$ and $y\leq -x/3+0.8 (0.7<x<1.2)$ $0.2\leq y\leq 0.4 (1.2\leq x)$ where x and y denote the amplitude ratio and the threshold value, respectively.

An ultrasonic measurement method of the present invention is an ultrasonic measurement method for measuring at least one of a propagation distance and a propagation direction of a selected ultrasonic wave among a plurality of ultrasonic waves that have been spectrum-spread with different codes, including: a step (A) of receiving the plurality of ultrasonic waves that have been spectrum-spread with different codes by first and second wave-receivers to produce first and second receive signals; a step (B) of de-spreading the first and second receive signals respectively with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal for the first and second receive signals, respectively; a step (C) of obtaining an amplitude ratio between the selected de-spread signal and the at least one non-selected de-spread signal for each of the first and second receive signals; a step (D) of determining at least one threshold value based on the amplitude ratio for each of the first and second receive signals; a step (E) of extracting a signal having an amplitude greater than or equal to the threshold value from the at least one non-selected de-spread signal by using the threshold value for each of the first and second receive signals to thereby produce at least one interfering signal; a step (F) of, for each of the first and second receive signals, spreading the at least one interfering signal with a corresponding non-selected code and then removing the at least one interfering signal from the first and second receive signals to thereby produce first and second receive signals from which the interfering signal has been removed; a step (G) of de-spreading the first and second receive signals from which the interfering signal has been removed each with the selected code to thereby obtain first and second de-spread signals from which the interfering signal has been removed; and a step (H) of calculating at least one of the propagation distance and the propagation direction of the selected ultrasonic wave based on points in time at which the first and second de-spread signals from which the interfering signal has been removed arrive at the first and second wave-receivers, wherein the step (D) includes obtaining in advance a relationship between a threshold value and the amplitude ratio where a correlation value between receive signals obtained from at least two wave-receivers from which the interfering signal has been removed is greater than or equal to a predetermined value, and determining a threshold value for an amplitude ratio based on the relationship obtained in advance.

In a preferred embodiment, the step (E) includes extracting a signal having an amplitude greater than or equal to the threshold value based on normalized amplitude information of the at least one non-selected de-spread signal; and the relationship is as follows:

$$y \leq -\frac{2}{3}x + \frac{19}{15} \ (0 < x \leq 1)$$

$$y \leq -0.25x + 0.85 \ (1 < x \leq 2)$$

$$y \geq 0.2007x^4 - 1.1459x^3 + 2.469x^2 - 2.4347x + 1.0748 (0 < x \leq 2)$$

where x and y denote the amplitude ratio and the threshold value, respectively.

In a preferred embodiment, the codes are M-sequence pseudo-spreading codes.

In a preferred embodiment, a 0-degree phase and a 180-degree phase of the ultrasonic wave are assigned to the codes.

An ultrasonic measurement device of the present invention is an ultrasonic measurement device for measuring at least one of a propagation distance and a propagation direction of a selected ultrasonic wave among a plurality of ultrasonic waves that have been spectrum-spread with different codes, including: first and second wave-receivers for receiving the plurality of ultrasonic waves that have been spectrum-spread with different codes to produce first and second receive signals, respectively; first and second de-spreading sections for de-spreading the first and second receive signals respectively with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal, respectively; first and second amplitude ratio calculation sections for obtaining an amplitude ratio between the selected de-spread signal and the at least one non-selected de-spread signal; first and second threshold value determination sections for determining at least one threshold value based on the amplitude ratio; first and second extraction sections for extracting a signal having an amplitude greater than or equal to the threshold value from the at least one non-selected de-spread signal by using the threshold value to thereby produce at least one interfering signal; first and second spreading sections for spreading the at least one interfering signal with a corresponding non-selected code; first and second interfering signal removing sections for removing the at least one spread interfering signal from each of the first and second receive signals to thereby produce first and second receive signals from which the interfering signal has been removed, respectively; first and second re-de-spreading sections for de-spreading the first and second receive signals from which the interfering signal has been removed with the selected code to thereby produce the first and second de-spread signals from which the interfering signal has been removed, respectively; and a distance/direction calculating section for calculating at least one of the propagation distance and the propagation direction of the selected ultrasonic wave based on points in time at which the first and second de-spread signals from which the interfering signal has been removed arrive at the first and second wave-receivers, wherein each of the first and second threshold value determination sections includes a storage section, and the storage section stores threshold values and corresponding amplitude ratios, obtained in advance, such that an S/N ratio of the first or second receive signal from which the interfering signal has been removed is greater than or equal to a predetermined value; and the amplitude ratio is received from the first and second amplitude ratio calculation sections so as to output a threshold value stored in the storage section corresponding to the amplitude ratio.

In a preferred embodiment, the first and second extraction sections extract a signal having an amplitude greater than or equal to the threshold value based on normalized amplitude information of the at least one non-selected de-spread signal; and the amplitude ratios and the threshold values stored in the storage section satisfy a relationship:

$y=1(0<x<0.3)$ $1>y\geq 0.4(0.3\leq x\leq 0.7)$ $y\geq -x/3+0.6$ and $y\leq -x/3+0.8(0.7<x<1.2)$ $0.2\leq y\leq 0.4(1.2\leq x)$ where x and y denote the amplitude ratio and the threshold value, respectively.

An ultrasonic measurement device of the present invention is an ultrasonic measurement device for measuring at least one of a propagation distance and a propagation direction of a selected ultrasonic wave among a plurality of ultrasonic waves that have been spectrum-spread with different codes, including: first and second wave-receivers for receiving the plurality of ultrasonic waves that have been spectrum-spread with different codes to produce first and second receive signals, respectively; first and second de-spreading sections for de-spreading the first and second receive signals respectively with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal, respectively; first and second amplitude ratio calculation sections for obtaining an amplitude ratio between the selected de-spread signal and the at least one non-selected de-spread signal; first and second threshold value determination sections for determining at least one threshold value based on the amplitude ratio; first and second extraction sections for extracting a signal having an amplitude greater than or equal to the threshold value from the at least one non-selected de-spread signal by using the threshold value to thereby produce at least one interfering signal; first and second spreading sections for spreading the at least one interfering signal with a corresponding non-selected code; first and second interfering signal removing sections for removing the at least one spread interfering signal from each of the first and second receive signals to thereby produce first and second receive signals from which the interfering signal has been removed, respectively; first and second re-de-spreading sections for de-spreading the first and second receive signals from which the interfering signal has been removed with the selected code to thereby produce the first and second de-spread signals from which the interfering signal has been removed, respectively; and a distance/direction calculating section for calculating at least one of the propagation distance and the propagation direction of the selected ultrasonic wave based on points in time at which the first and second de-spread signals from which the interfering signal has been removed arrive at the first and second wave-receivers, wherein each of the first and second threshold value determination sections includes a storage section, and the storage section stores threshold values and corresponding amplitude ratios such that a correlation value between the first and second receive signals from which the interfering signal has been removed is greater than or equal to a predetermined value; and the amplitude ratio is received from the first and second amplitude ratio calculation sections so as to output a threshold value stored in the storage section corresponding to the amplitude ratio.

In a preferred embodiment, the first and second extraction sections extract a signal having an amplitude greater than or equal to the threshold value based on normalized amplitude information of the at least one non-selected de-spread signal; and the amplitude ratios and the threshold values stored in the storage section satisfy a relationship:

$$y \leq -\frac{2}{3}x + \frac{19}{15} \ (0 < x \leq 1)$$

$$y \leq -0.25x + 0.85 \ (1 < x \leq 2)$$

$$y \geq 0.2007x^4 - 1.1459x^3 + 2.469x^2 - 2.4347x + 1.0748 (0 < x \leq 2)$$

where x and y denote the amplitude ratio and the threshold value, respectively.

In a preferred embodiment, the codes are M-sequence pseudo-spreading codes.

In a preferred embodiment, a 0-degree phase and a 180-degree phase of the ultrasonic wave are allocated to the codes.

An ultrasonic measurement device of the present invention is an ultrasonic measurement device for measuring at least one of a propagation distance and a propagation direction of a selected ultrasonic wave among a plurality of ultrasonic waves that have been spectrum-spread with different codes, including: a wave-receiver for receiving the plurality of ultrasonic waves that have been spectrum-spread with different codes to produce a receive signal; a de-spreading section for de-spreading the receive signal with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal, respectively; an amplitude ratio calculation section for obtaining an amplitude ratio between the selected de-spread signal and the at least one non-selected de-spread signal; a threshold value determination section for determining at least one threshold value based on the amplitude ratio; an extraction section for extracting a signal having an amplitude greater than or equal to the threshold value from the at least one non-selected de-spread signal by using the threshold value to thereby produce at least one interfering signal; a spreading section for spreading the at least one interfering signal with a corresponding non-selected code; an interfering signal removing section for removing the at least one spread interfering signal from the receive signal to thereby produce a receive signal from which the interfering signal has been removed; a re-de-spreading section for de-spreading the receive signal from which the interfering signal has been removed with the selected code to thereby produce a de-spread signal from which the interfering signal has been removed; and a distance/direction calculating section for calculating the propagation distance of the selected ultrasonic wave based on a point in time at which the de-spread signal from which the interfering signal has been removed arrives at the wave-receiver.

Effects of the Invention

Thus, according to the present invention, the threshold value, which is used for extraction when producing interfering signals, is varied so that the receive signal, from which the interfering signal has been removed, has a desirable S/N ratio. The threshold value is determined from the amplitude ratio between the selected de-spread signal obtained by de-spreading the receive signal using the selected code, which has been used for spreading the selected ultrasonic wave, and the non-selected de-spread signal obtained by de-spreading the receive signal using the non-selected code, which has been used for spreading the non-selected ultrasonic wave. By determining the threshold value according to the amplitude ratio, it is possible to appropriately evaluate the influence of noise contained in the non-selected de-spread signal, and to reproduce an accurate interfering signal with little influence of noise. Thus, according to the present invention, it is possible to perform optimal interference removal, and to accurately measure the distance to, or the direction of, the object.

BRIEF DESCRIPTION OF DRAWINGS

FIGS. 16 (a) and (b) show the relationship between amplitude information 67 of a waveform 62 that has been de-spread with a spreading code assigned to an ultrasonic measurement device S2 and a threshold value LUT 26.

FIG. 21 (a) to (c) show waveforms obtained by de-spreading the waveforms shown in FIGS. 20(a), (c) and (d), respectively.

Figure 1:
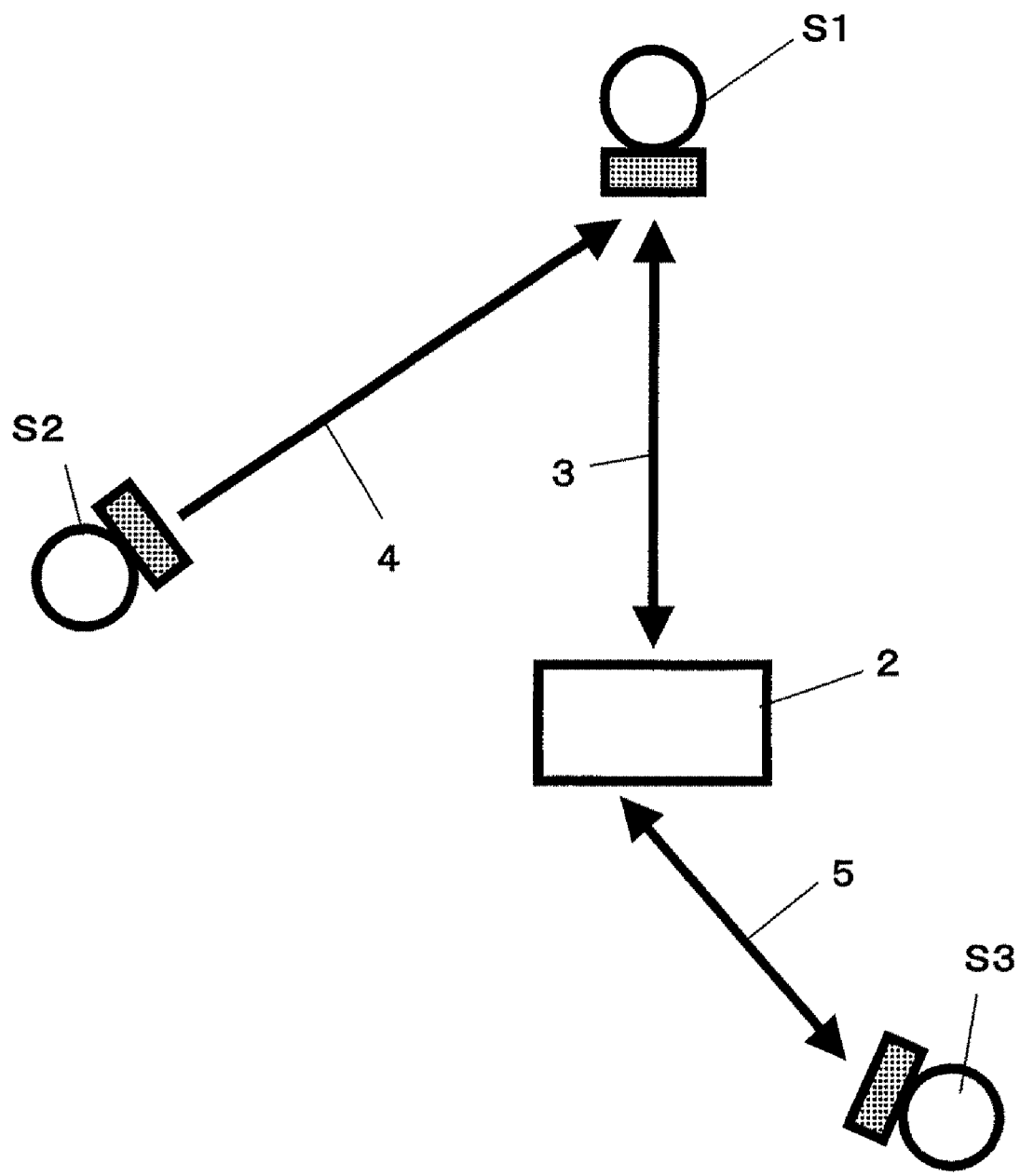
FIG. 1 A diagram showing an example of an environment where ultrasonic measurement devices are used according to the present invention.

DESCRIPTION OF THE REFERENCE NUMERALS 2 object
3, 4, 5 ultrasonic wave propagation path
6 spreading code
12 wave-transmitter
13 wave-receiver
14 transmitting section
15 calculation section
17 receiving section
18 window setting section
20 interference remover
21 distance/direction calculating section
22 de-spreading section
23 demodulation section
25 amplitude ratio calculation section
26 threshold value LUT
27 extraction section
28 spreading section
29 adder
30 delay section
31 re-de-spreading section
S1, S2, S3 ultrasonic measurement device

BEST MODE FOR CARRYING OUT THE INVENTION

Embodiments of the ultrasonic measurement device and the ultrasonic measurement method of the present invention will now be described with reference to the drawings. The ultrasonic measurement device of the present invention measures at least one of the propagation distance and the propagation direction of an intended, selected ultrasonic wave, among a plurality of ultrasonic waves. FIG. 1 schematically shows an environment where ultrasonic measurement devices of the present invention are used, and there are a plurality of ultrasonic measurement devices.

An ultrasonic measurement device S1 transmits an ultrasonic wave through a propagation path 3 toward an object 2, and receives the reflected wave reflected at the object 2 to thereby measure the length of the propagation path 3 or the distance between the object 2 and the ultrasonic measurement device S1. It is also possible to determine the direction of the object 2 as viewed from the ultrasonic measurement device S1.

An ultrasonic measurement device S2 and an ultrasonic measurement device S3 transmit/receive ultrasonic waves to thereby measure distance or direction. The ultrasonic wave transmitted from the ultrasonic measurement device S2 passes through a propagation path 4 to reach the ultrasonic measurement device S1. On the other hand, the ultrasonic wave transmitted from the ultrasonic measurement device S3 does not reach the ultrasonic measurement device S1.

The ultrasonic measurement device S1, the ultrasonic measurement device S2 and the ultrasonic measurement device S3 are operating independently of one another, and are not transmitting/receiving information regarding the operation of the other ultrasonic measurement devices.

The ultrasonic measurement device S1 will now be described as the present embodiment. Note that the ultrasonic measurement device S1 includes a wave-transmitter for transmitting an ultrasonic wave, and a driving section for driving the wave-transmitter in the present embodiment. Alternatively, the ultrasonic measurement device S1 may not include the wave-transmitter and the driving section, and may receive an ultrasonic wave transmitted from an ultrasonic wave transmitting device independent of the ultrasonic measurement device S1 to thereby measure the distance between the ultrasonic wave transmitting device and the ultrasonic measurement device S1 or measure the direction of the ultrasonic wave transmitting device. While an environment where three ultrasonic measurement devices are operating is described for an easy understanding of the invention, the present invention can accurately measure distance or direction by suitably reducing the influence from other ultrasonic measurement devices in an environment where more ultrasonic measurement devices are operating.

The ultrasonic waves transmitted from the ultrasonic measurement devices S1 to S3 shown in FIG. 1 are spectrally spread by being encoded with different M-sequence codes. As a modulation scheme for encoding, a 2-phase phase shift modulation is used, for example, in which a spreading code of "1" is associated with a sinusoidal wave of 100 kHz or less and a spreading code of "0" is associated with a sinusoidal wave of 100 kHz or less whose phase is inverted by 180 degrees. Note that this sinusoidal wave of 100 kHz or less will be referred to as a carrier.

The wave count of the sinusoidal wave present within a single code of the spreading code is preferably determined according to the bandwidth of the wave-transmitter and the wave-receiver used. The wave count is set higher when the bandwidth is narrower, and lower when it is wider. As the wave count is lower, the spreading rate of the spread spectrum is higher, thus improving the anti-noise property. As the order of the M-sequence (the length of the M-sequence) is larger, the correlation with other M-sequences is lower. Therefore, a larger order of the M-sequence is preferred as there will be less interfering noise. However, as the order increases, the ultrasonic wave transmitted becomes longer, thus being more easily influenced by environmental changes.

In view of these points, a $7^{th}$-order M-sequence is used in an environment where there are a maximum of four ultrasonic wave measurement devices, and a $9^{th}$-order M-sequence is used in an environment where there are a maximum of ten ultrasonic wave measurement devices, for example. It is preferred that the length of the M-sequence is changed according to the number of ultrasonic measurement devices present in the same environment. For example, in a case where the frequency of the carrier is 40 kHz, and the wave count of the sinusoidal wave present within a single code is 1, the length of the ultrasonic wave transmitted is about 3 ms if a $7^{th}$-order M-sequence is used.

Figure 2:
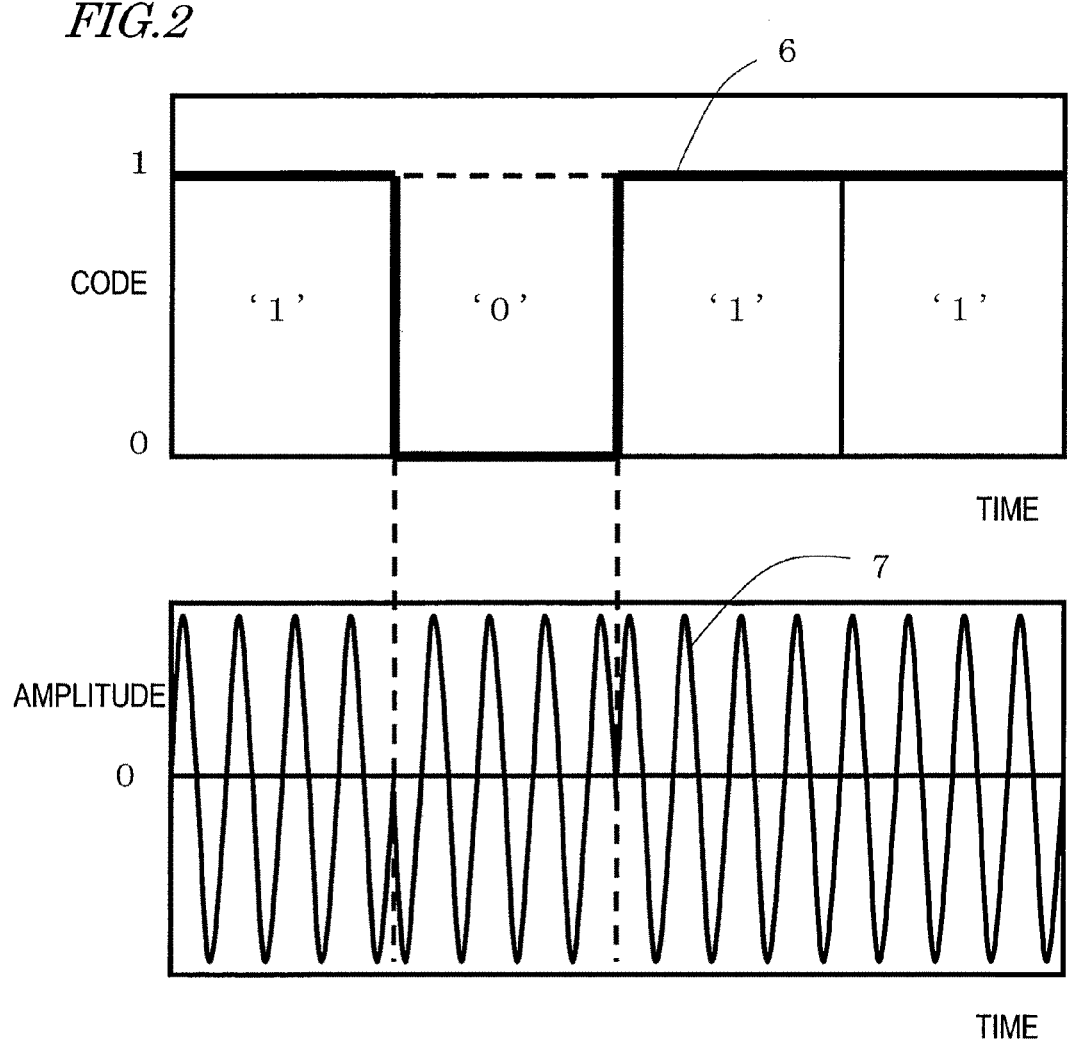
FIG. 2 A diagram illustrating a 2-phase phase shift modulation used in the present invention.

FIG. 2 is a diagram illustrating a 2-phase phase shift modulation scheme. For example, in a case where a sinusoidal wave carrier is spread by a 2-phase phase shift modulation scheme using a spreading code 6 represented as "1, 0, 1, 1", there is obtained a random wave of a waveform 7. In the waveform 7, the phase is inverted at the boundaries between the code "0" and the code "1".

Figure 3:
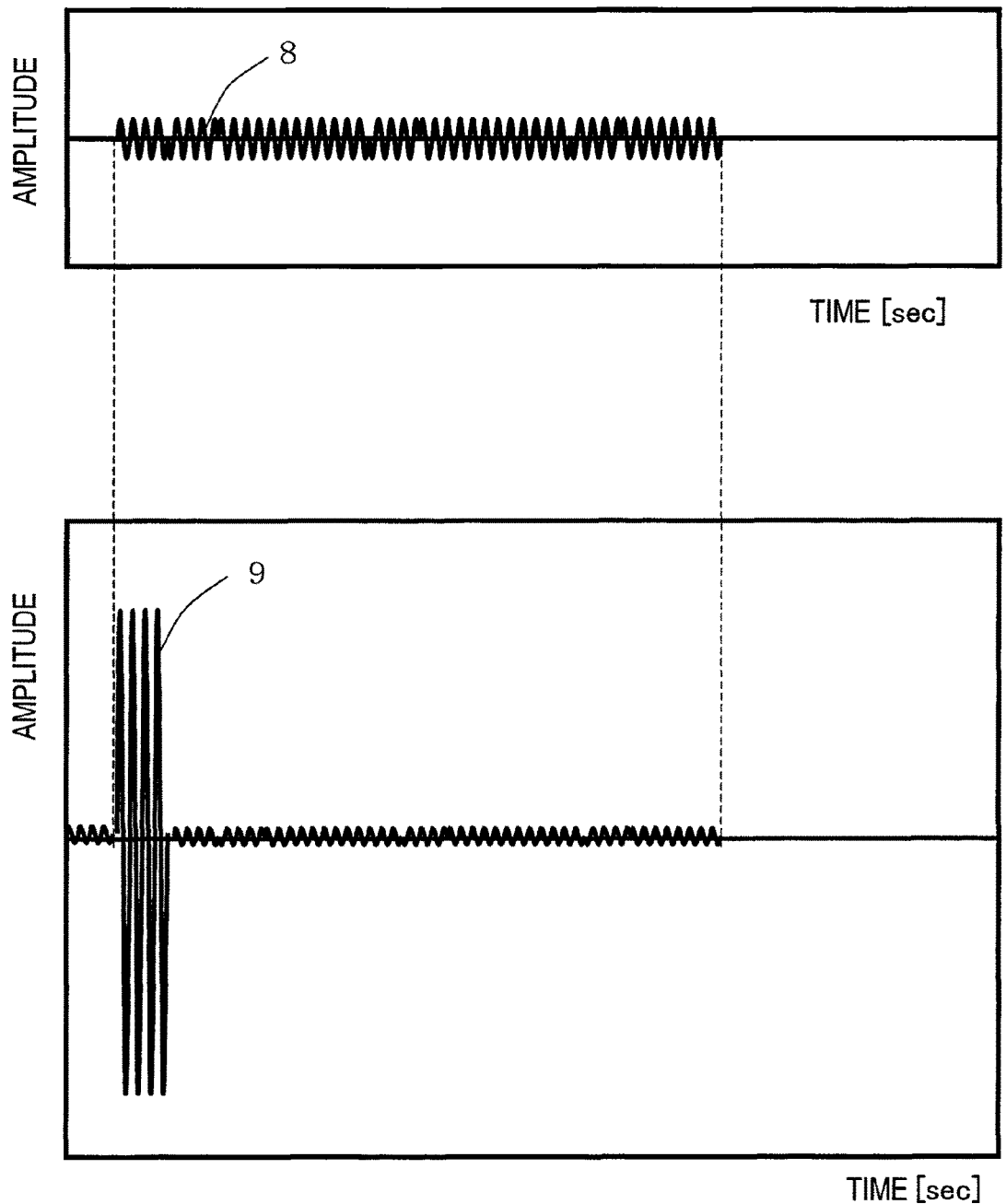
FIG. 3 A diagram illustrating a waveform obtained by de-spreading a spread signal.

FIG. 3 shows a waveform 8, which is an example of a signal spread by a 2-phase phase shift modulation scheme using an M-sequence spreading code. A waveform 9 is obtained if the waveform 8 is de-spread with the same spreading code. Such a waveform does not appear if the code used in spreading and that used in de-spreading are different from each other. Therefore, the ultrasonic measurement device S1, the ultrasonic measurement device S2 and the ultrasonic measurement device S3 of FIG. 1 each spread an ultrasonic wave to be transmitted with a different spreading code and de-spread a received signal with its own spreading code, thus being able to extract only the waveform that it has transmitted.

Figure 4:
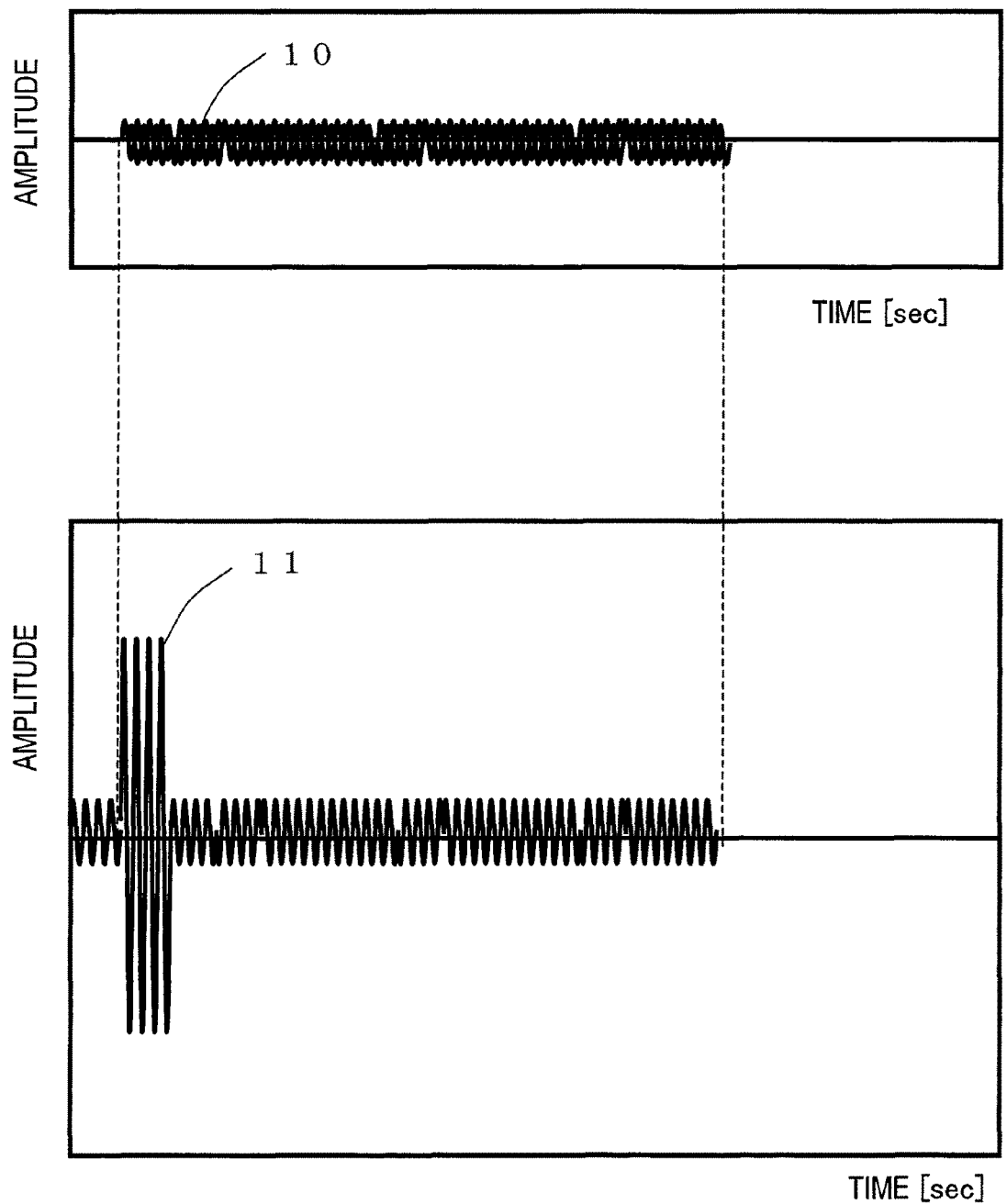
FIG. 4 A diagram illustrating a waveform obtained by de-spreading a spread signal on which an interfering wave is superimposed.

FIG. 4 shows a waveform 10 of a signal interfered with a signal that has been spread with a different code. It is possible to obtain a waveform 11 by de-spreading the waveform 10 with a correct spreading code, not the code of the interfering signal. It can be seen that the amplitude ratio (relative amplitude) between the noise portion and the extracted signal is small, as compared with the waveform 9 of FIG. 3. The amplitude ratio decreases as the number of interfering signals increases.

This is because spreading codes are not completely random and there is some cross-correlation between different codes, and therefore the amplitude component of the interfering signal is superimposed depending on the correlation value. The waveform 10 of FIG. 4 shows a case where the amplitude of the interfering signal is substantially the same as that of the subject signal. However, when the amplitude of the interfering signal is greater than that of the subject signal, the amplitude of the noise portion further increases, thus making it difficult to extract the intended signal.

In the environment shown in FIG. 1, the ultrasonic wave that the ultrasonic measurement device S1 uses for measuring the distance to, or the direction of, the object 2 passes through the propagation path 3 to be reflected by the object 2, and passes again through the propagation path 3 to return to the ultrasonic measurement device S1. In contrast, the ultrasonic wave from the ultrasonic measurement device S2 passing through the propagation path 4 is not reflected by the object 2, or the like, but directly reaches the ultrasonic measurement device S1. Therefore, the ultrasonic wave from the ultrasonic measurement device S2 reaching the ultrasonic measurement device S1 has a greater energy than that of the ultrasonic wave transmitted from the ultrasonic measurement device S1 and reflected by the object 2. That is, with the ultrasonic measurement device S1, the interfering signal is greater than the subject signal, and it is difficult to accurately measure the propagation time of the subject signal unless the interfering signal is removed.

The ultrasonic measurement device of the present invention produces a receive signal free from the influence due to interference by removing the interfering signal, and accurately measures the propagation time of the ultrasonic wave using the obtained receive signal, thus being able to accurately measure distance or direction. However, in a case where the ultrasonic measurement devices S1 to S3 are mounted on vehicles such as self-propelled robots, for example, the positions of the ultrasonic measurement devices S1 to S3 change constantly. Therefore, the direction or the intensity of ultrasonic waves coming from other ultrasonic measurement devices changes substantially, thereby also substantially changing the intensity of the interfering signal. Thus, the ultrasonic measurement device of the present invention accurately reproduces the interfering signal based on the intensity ratio between the signal of the intended ultrasonic wave and the signal of an interfering ultrasonic wave.

Figure 5:
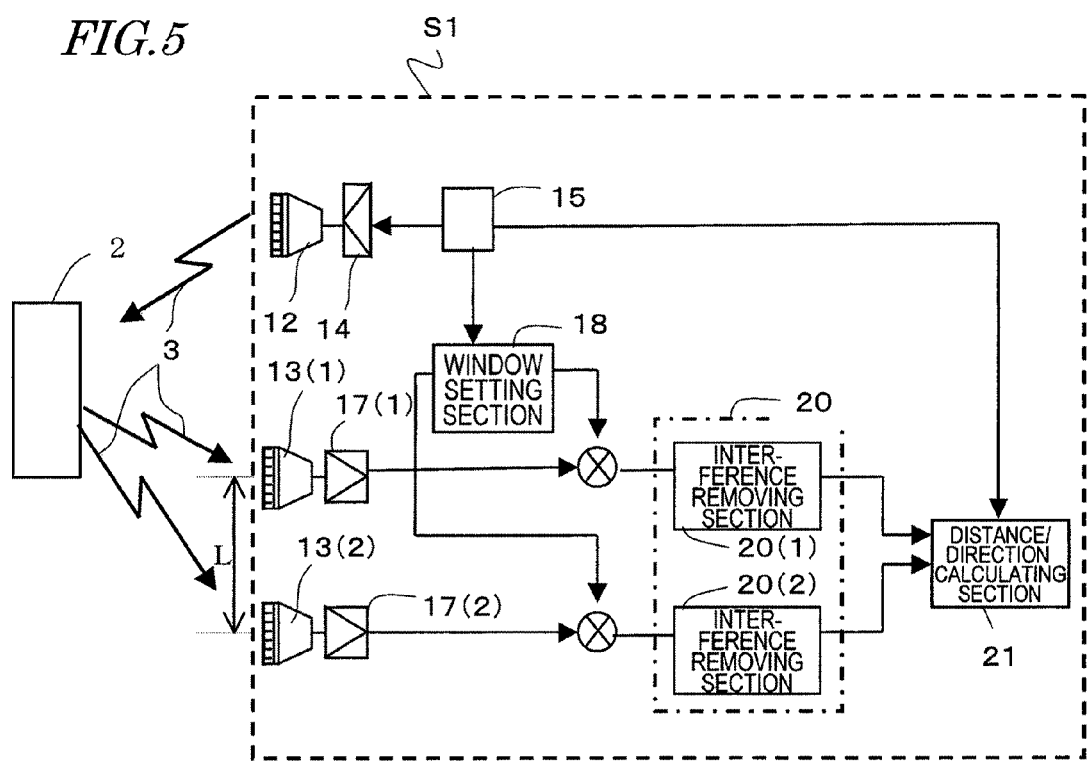
FIG. 5 A block diagram showing a basic configuration of an embodiment of an ultrasonic measurement device according to the present invention.

FIG. 5 is a block diagram showing a basic configuration of the ultrasonic measurement device S1 of the present invention. The ultrasonic measurement device includes a wave-transmitter 12, a first wave-receiver 13(1), a second wave-receiver 13(2), a transmitting section 14, a calculation section 15, a first receiving section 17(1), a second receiving section 17(2), a window setting section 18, an interference remover 20, and a distance/direction calculating section 21. Some of the components of the ultrasonic measurement device, such as the interference remover 20, or some of functions served by the components, may be implemented by software.

In the present embodiment, an ultrasonic wave is received by the first wave-receiver 13(1) and the second wave-receiver 13(2) to obtain the propagation time of each of the ultrasonic waves received by the receivers. The direction from which the ultrasonic wave has propagated is calculated based on the difference in propagation time. Hereinafter, the first wave-receiver 13(1) and the second wave-receiver 13(2) may be referred to collectively as a wave-receiver 13.

In a case where the maximum measurement distance (limit of measurement) of the ultrasonic measurement device is set to 5 m to 10 m, the frequency of the ultrasonic wave used can be determined in view of the maximum measurement distance and the attenuation characteristic of the ultrasonic wave through the air. If the frequency of the ultrasonic wave is higher, the wavelength is shorter, thus improving the time resolution of the propagation time measurement. However, a high frequency also increases the attenuation of the ultrasonic wave through the air. In a case where the maximum measurement distance is set to 5 m, for example, also taking into account the driving of the wave-transmitter 12 and the wave-receiver 13, an ultrasonic wave of 100 kHz or less is suitable. In the present embodiment, an ultrasonic wave of 40 kHz is used for measurement.

The wave-transmitter 12 and the wave-receiver 13 may be a wave-transmitter and a wave-receiver, or the like, that include an ultrasonic vibrator using a flexural vibrator of a piezoelectric ceramic or use a PVDF piezoelectric polymer film as a vibrator. The first wave-receiver 13(1) and the second wave-receiver 13(2) are arranged adjacent to each other with the distance L therebetween. In a case where the maximum measurement distance is 5 m, the distance L is preferably less than or equal to the wavelength of the ultrasonic wave (8.5 mm for 40 kHz). As long as ultrasonic vibrators, or the like, of the same standard are used as the first wave-receiver 13(1) and the second wave-receiver 13(2), variations in the characteristics of the wave-receiver have little influence on the measurement precision.

Figure 6:
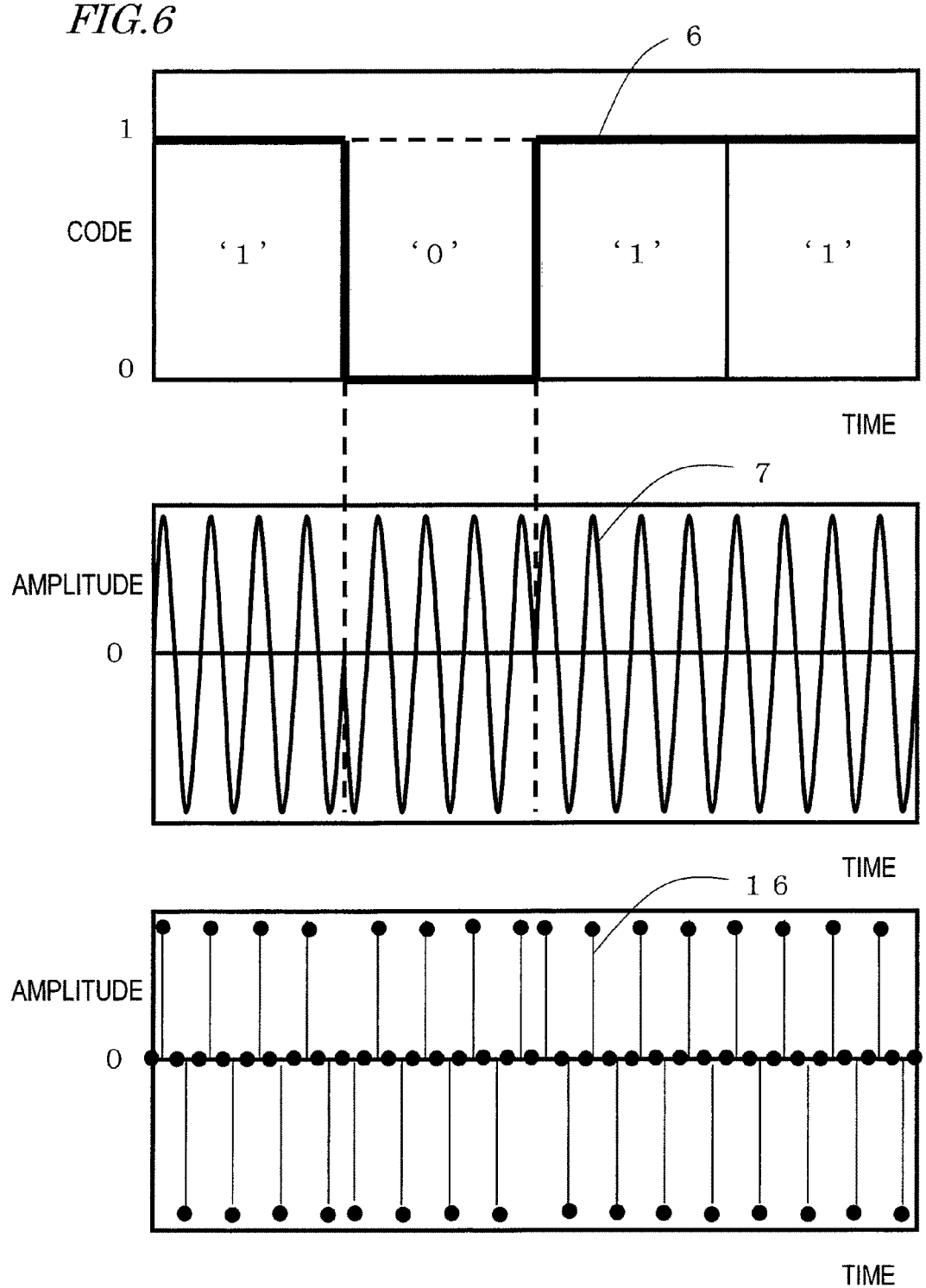
FIG. 6 A diagram showing an example of a driving signal 16 produced in a calculation section 14 of the ultrasonic measurement device of FIG. 5.

The calculation section 15 is implemented by a microcomputer, or the like, and produces driving signals and controls the interference remover 20, the window setting section 18, and the distance/direction calculating section 21. An example of the driving signal produced in the calculation section 15 is shown by the waveform 7 in FIG. 6. The driving signal produced in the calculation section 15 drives the transmitter 12 at the apex of the amplitude of the random wave 7, which has been spread by the M-sequence spreading code 6. It is assumed that the sampling cycle of the driving signal produced in the calculation section 15 is four times the frequency of the carrier. The driving signal output from the calculation section 15 is amplified through the transmitting section 14 to drive the transmitter 12. Thus, an ultrasonic wave is transmitted.

The first wave-receiver 13(1) and the second wave-receiver 13(2) each receive an ultrasonic wave reflected at the object 2, and convert the received ultrasonic wave to an electrical receive signal. The first receiving section 17(1) and the second receiving section 17(2) each amplify a receive signal, and perform an A-D conversion. The sampling frequency of the A-D conversion is preferably four times or more the frequency of the carrier.

The calculation section 15 cuts out a portion of each of the receive signals, which have been received by the first wave-receiver 13(1) and the second wave-receiver 13(2) and converted to digital data, over a certain period of time after the passage of a certain period of time since the transmission start time, and the data of the cut-out receive signal is output to the interference remover 20. "Over a certain period of time" as used herein means T2-T1, where T1 and T2 respectively denote the earliest and latest points in time when a transmitted ultrasonic wave reaches the first wave-receiver 13(1) or the second wave-receiver 13(2). The time setting for cutting out the receive signal data is determined based on the measurement distance that can be measured by the ultrasonic measurement device and the length of the ultrasonic wave used for measurement.

For example, in a case where the measurement range is 1 m to 5 m, since the ultrasonic wave reciprocates between the object present within the measurement range and the ultrasonic measurement device, the propagation distance is 2 m to 10 m. Since the sonic speed of an ultrasonic wave through the air is about 340 m/sec, 2 m and 10 m can be converted to propagation times of about 6 msec and about 30 msec, respectively. Moreover, the length of the signal of the $7^{th}$-order M-sequence is about 9.5 msec, assuming that the frequency of the carrier is 40 kHz and the wave count of the sinusoidal wave present within a single code is three. Therefore, the earliest point in time T1 at which an ultrasonic wave arrives is 6 ms, and the latest point in time T2 at which an ultrasonic wave arrives is 39.5 msec. Therefore, the window setting section 18 sets a window with which to cut out the receive data so as to include a period from time T1=6 ms to time T2=39.5 ms, where zero is the point in time at which the transmission of the ultrasonic wave is started.

Figure 7:
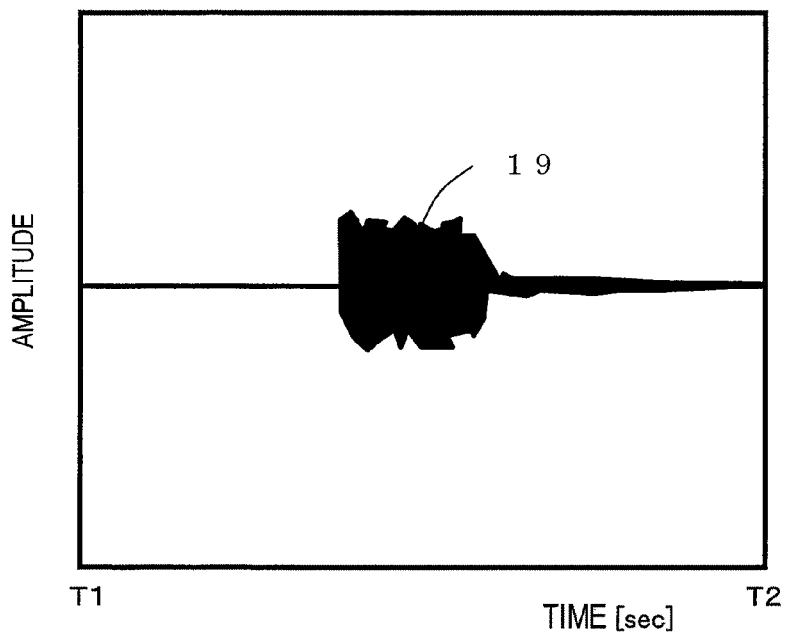
FIG. 7 A diagram showing receive data 19 of the ultrasonic measurement device of FIG. 5.

FIG. 7 shows a waveform of the receive data 19, which has been received by the first wave-receiver 13(1) and cut out.

Data of a similar waveform is obtained also from the second wave-receiver 13(2). These data are input to the interference remover 20.

As shown in FIG. 5, the interference remover 20 includes a first interference removing section 20(1) and a second interference removing section 20(2). The first interference removing section 20(1) and the second interference removing section 20(2) produce interfering signals to be removed from the receive signals, which have been received respectively by the first wave-receiver 13(1) and the second wave-receiver 13(2) and cut out, and remove the interfering signals from the receive signals. In the present embodiment, an interference removing process is performed for optimally removing the ultrasonic wave from the ultrasonic measurement device S2 as shown in FIG. 1. The operation of the interference remover 20 will be described below in detail.

Two receive signals, which have been subjected to the interference removing process, are input to the distance/direction calculator 21. The distance/direction calculator 21 obtains the arrival times of the two receive signals, which have been subjected to the interference removing process, i.e., receive signals that have been produced by the first wave-receiver 13(1) and the second wave-receiver 13(2) receiving only the ultrasonic wave transmitted from the transmitter 12 and reflected at the object 2, and obtains the difference between the arrival times and the amount of time elapsed from the start of transmission, thereby calculating the distance from the object 2 and the direction thereof. The process may directly obtain the temporal position of the waveform from the receive signals, or may convert the two receive signals to amplitude information and obtain the temporal position of the peak value of the amplitude information. For example, it can be obtained by a method described in Japanese Journal of Applied Physics Vol. 43, No. 5B, 2004, pp. 3169-3175.

Moreover, where $\Delta T$ is the difference between points in time at which an ultrasonic wave from a sound source that is sufficiently far away is detected by two ultrasonic wave-receivers, and v is the sonic speed of the ultrasonic wave, the angle $\theta$ representing the direction of the object 2 can be obtained by an expression below, by using the distance L between the two ultrasonic wave-receivers.

$$\sin\theta = \frac{v\Delta T}{L} \quad (1)$$

Alternatively, the direction may be obtained based on the phase difference between the two receive signals, from which the interfering signal has been removed. In a case where the frequency of the carrier of the ultrasonic wave is 40 kHz, one waveform is equal to 25 μs (=1/40 kHz). Since the phase $2\pi$ for this one wavelength is equivalent to 25 μs, a phase difference can be converted to a time difference, and the direction can be further obtained using Expression (1).

Figure 8:
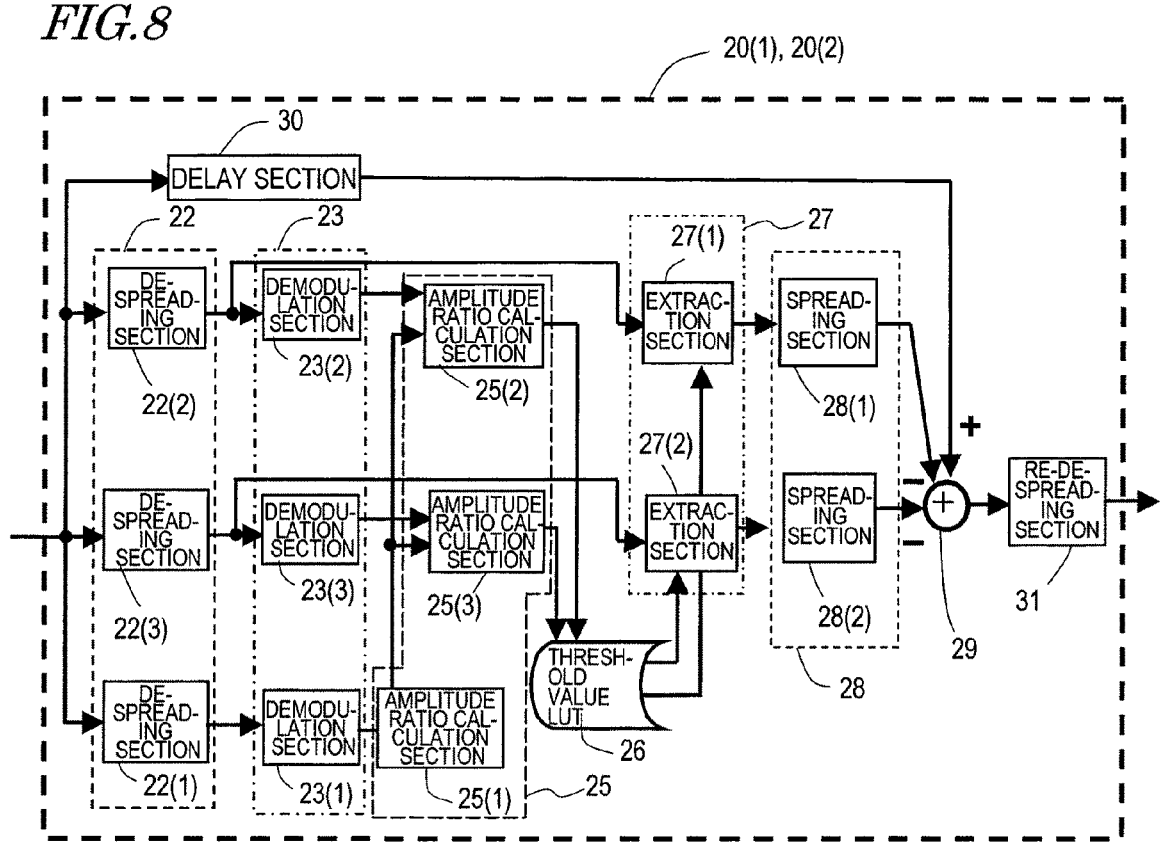
FIG. 8 A block diagram showing a basic configuration of an interference remover 20 of the ultrasonic measurement device of FIG. 5.

Next, the configuration and the operation of the interference remover 20 will be described. FIG. 8 is a block diagram showing a basic configuration of the first and second interference removing sections 20(1) and 20(2) included in the interference remover 20. Each of the first and second interference removing sections 20(1) and 20(2) includes de-spreading sections 22(1) to 22(3), demodulation sections 23(1) to 23(3), amplitude ratio calculation sections 25(1) to 25(3), extraction sections 27(1) and 27(2), a threshold value LUT (lookup table) 26, spreading sections 28(1) and 28(2), an interfering signal removing section 29, the delay section 30, and a re-de-spreading section 31. The threshold value LUT 26 represents values stored in a storage section such as a memory.

In the present embodiment, there are the ultrasonic measurement devices S2 and S3 that transmit ultrasonic waves to be removed, other than the ultrasonic measurement device S1, as shown in FIG. 1. That is, ultrasonic waves that are spread with three different spreading codes are handled. Thus, each of the first and second interference removing sections 20(1) and 20(2) is provided with three each of the de-spreading sections 22(1) to 22(3), the demodulation sections 23(1) to 23(3), and the amplitude ratio calculation sections 25(1) to 25(3). Since the receive signals of two of the ultrasonic waves, which have been spread with three different spreading codes, should be removed as interfering signals, two each of the extraction sections 27(1) and 27(2) and the spreading sections 28(1) and 28(2) are provided. These components are provided according to the number of ultrasonic waves that are spread with different codes in the measurement environment. In the present specification, the de-spreading sections 22(1) to 22(3), the demodulation sections 23(1) to 23(3), the amplitude ratio calculation sections 25(1) to 25(3), the extraction sections 27(1) and 27(2), the spreading sections 28(1) and 28(2), the interfering signal removing section 29 and the re-de-spreading section 31 of the first interference removing section 20(1) may be referred to also as the first de-spreading section 22, the first demodulation section 23, the first amplitude ratio calculation section 25, the first extraction section 27, the first spreading section 28, the first interfering signal removing section 29 and the first re-de-spreading section 31, respectively. Similarly, the de-spreading sections 22(1) to 22(3), the demodulation sections 23(1) to 23(3), the amplitude ratio calculation sections 25(1) to 25(3), the extraction sections 27(1) and 27(2), the spreading sections 28(1) and 28(2), the interfering signal removing section 29 and the re-de-spreading section 31 of the second interference removing section 20(2) may be referred to also as the second de-spreading section 22, the second demodulation section 23, the second amplitude ratio calculation section 25, the second extraction section 27, the second spreading section 28, the second interfering signal removing section 29 and the second re-de-spreading section 31, respectively.

Figure 9:
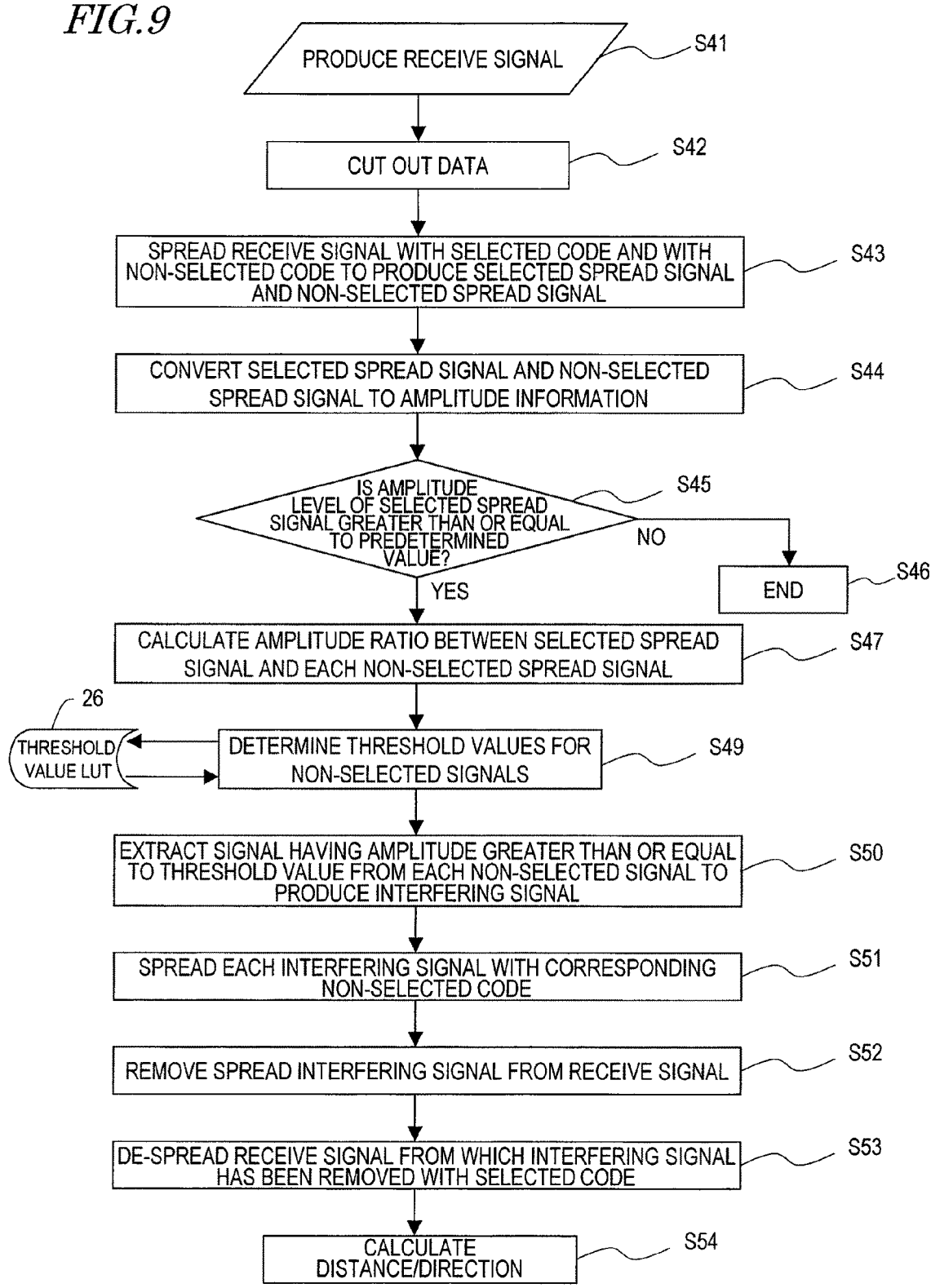
FIG. 9 A flow chart showing an ultrasonic measurement method according to the present embodiment.

FIG. 9 is a flow chart illustrating the operation of an ultrasonic measurement device, focusing on the interference remover 20. Referring now to FIGS. 1, 5, 8 and 9, the operation of the ultrasonic measurement device will now be described sequentially. While an ultrasonic wave received by the first wave-receiver 13(1) will be described in the description below, receive signals received by the first wave-receiver 13(1) and the second wave-receiver 13(2) are processed in exactly the same procedure.

As shown in FIG. 1, in the present embodiment, the ultrasonic wave transmitted from the ultrasonic measurement device S1 is the intended ultrasonic wave with which to measure the distance to the object 2. Hereinafter, an ultrasonic wave transmitted from S1 may be referred to as the "selected ultrasonic wave", and a code, a de-spread signal, etc., that are associated with the selected ultrasonic wave may be referred to as the "selected code", the "selected spreading code", etc. Moreover, an ultrasonic wave other than the intended ultrasonic wave may be referred to as a "non-selected ultrasonic wave", a "non-selected code", a "non-selected spread signal", etc.

(Step S41)

Step S41 corresponds to step A. First, an ultrasonic wave is received by the first wave-receiver 13(1), and the first receive signal is converted to a digital signal by the first receiving section 17(1).

(Step S42)

Step S42 corresponds to step B. As described above, data of a range of the first receive signal that contains the signal of the ultrasonic wave to be detected is cut out by the window setting section 18, and input to a first spread removing section 20(1) of the spread remover 20.

(Step S43)

Step S43 corresponds to step B. The cut-out first receive signal is de-spread with all codes by the de-spreading sections 22(1) to 22(3) of the first spread removing section 20(1). The de-spreading section 22(1) performs the de-spreading process with the spreading code assigned to the ultrasonic measurement device S1, i.e., the selected code used for the spreading of the selected ultrasonic wave, thereby producing a selected de-spread signal. The de-spreading sections 22(2) and 22(3) perform the de-spreading process with spreading codes assigned to the ultrasonic measurement devices S2 and S3, respectively, i.e., non-selected codes used for the spreading of the non-selected ultrasonic waves, thereby producing non-selected de-spread signals.

Figure 10:
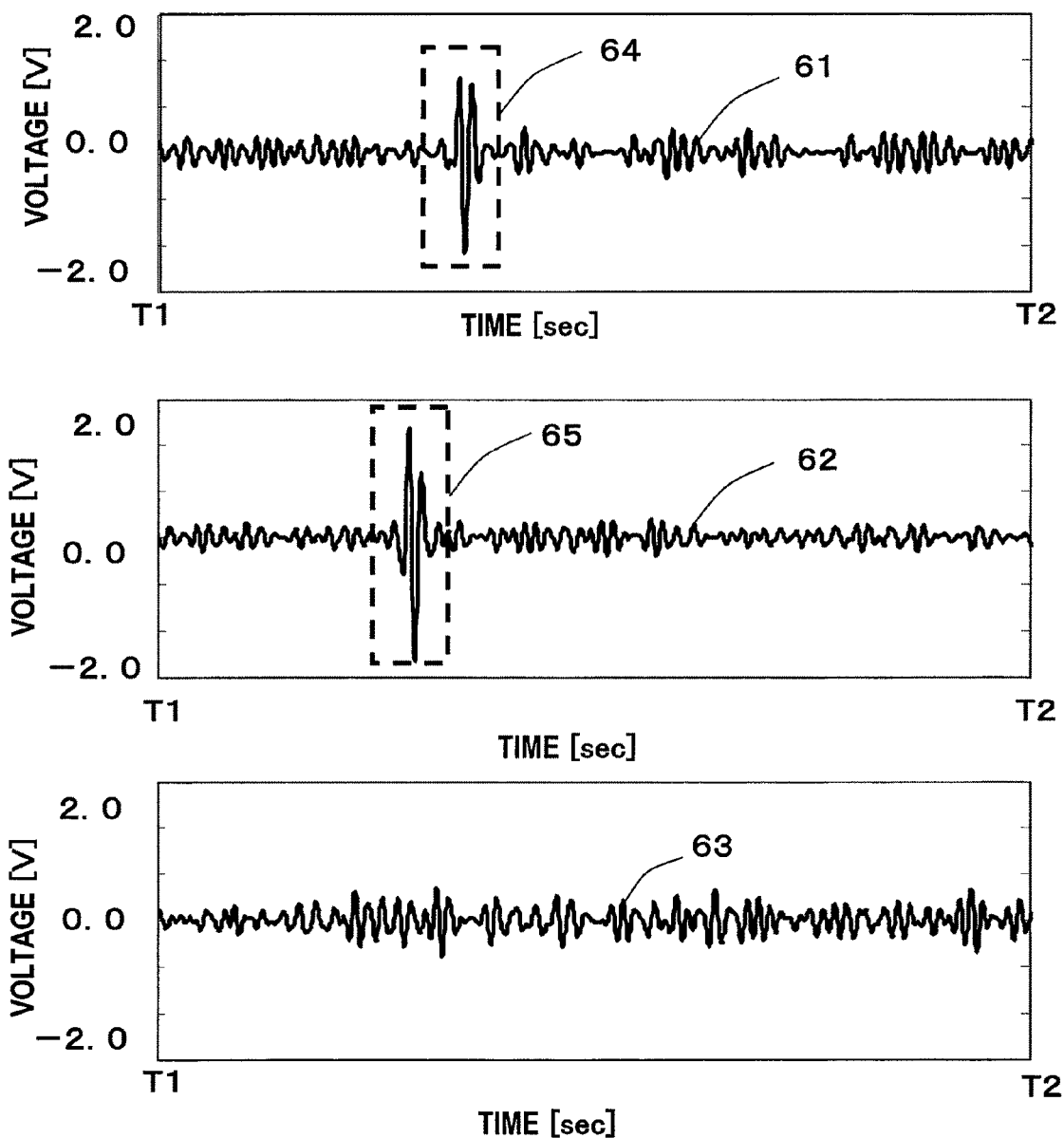
FIG. 10 Shows waveforms of de-spread signals before interfering signals are removed in the present embodiment.

FIG. 10 shows an example of these de-spread signals, i.e., de-spread signals 61, 62 and 63 that have been de-spread with spreading codes assigned to the ultrasonic measurement devices S1, S2 and S3, respectively.

The de-spread signals 61 and 62 contain sinusoidal waves 64 and 65 of 100 kHz or less, but the de-spread signal 63 does not contain a sinusoidal wave. This indicates that the ultrasonic measurement device S1 receives the ultrasonic waves transmitted from the ultrasonic measurement device S1 and the ultrasonic measurement device S2, but does not receive the ultrasonic wave transmitted from the ultrasonic measurement device S3. The sinusoidal waves 64 and 65 look different from the waveforms immediately after being transmitted because the sinusoidal waves 64 and 65 receive inherent influences from the propagation paths 3 and 4, respectively (FIG. 1). That is, the sinusoidal waves 64 and 65 reflect the characteristics of the propagation paths. Moreover, the sinusoidal wave 65 arrives at an earlier point in time than the sinusoidal wave 64. However, it appears that the de-spread signal 61 does not contain the sinusoidal wave 65. This is because with the de-spread signal 61, which is obtained by de-spreading with the spreading code assigned to the ultrasonic measurement device S1, ultrasonic waves that have been spread with other spreading codes have only as little influence as noise. However, if the number of ultrasonic waves that have been spread with other spreading codes increases, there will appear a peak due to cross-correlation, as described above. In view of this, signals of ultrasonic waves that have been spread with other spreading codes are removed as interfering signals.

(Step S44)

Figure 11:
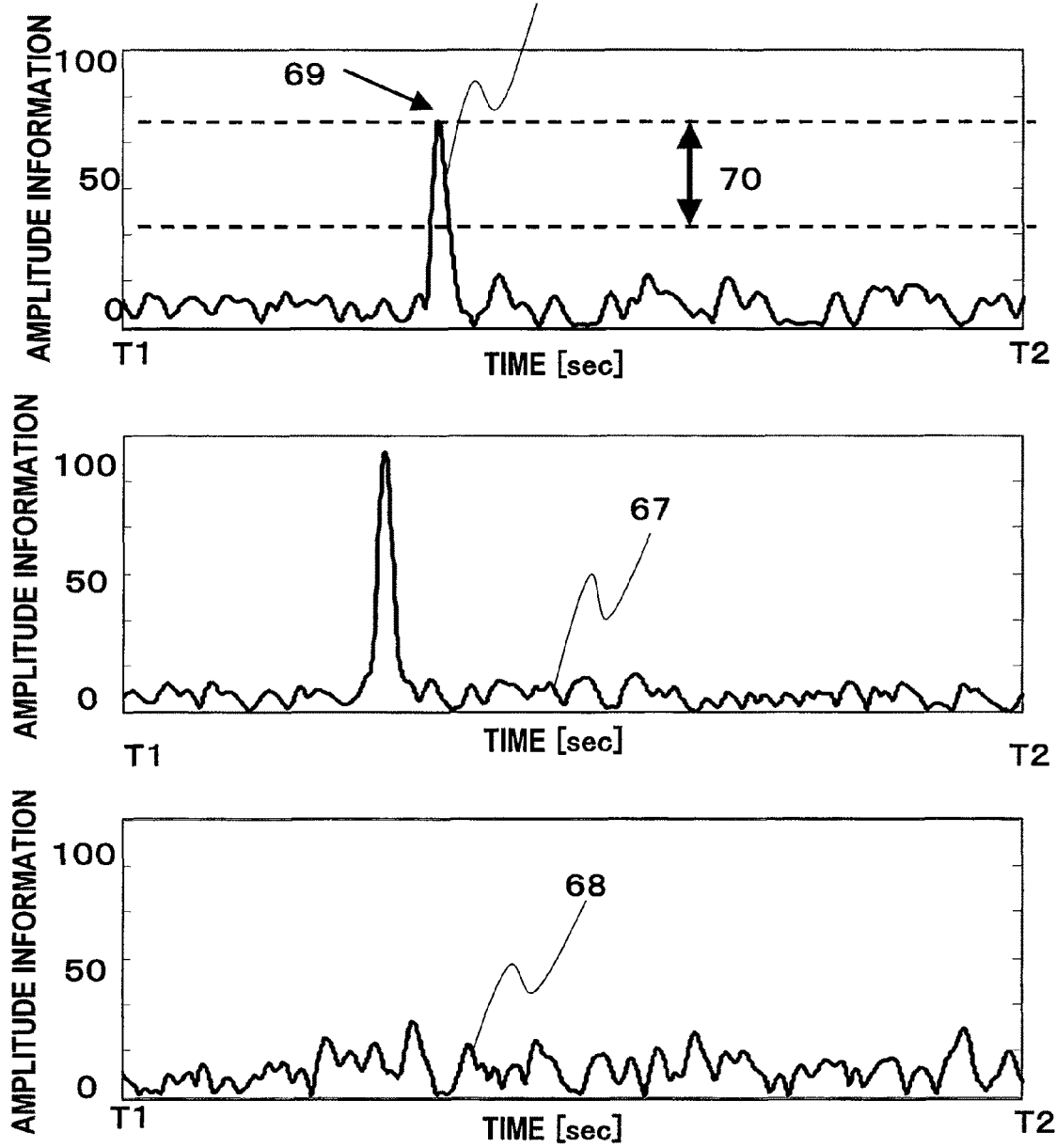
FIG. 11 Shows waveforms of amplitude information of de-spread signals 61, 62 and 63 shown in FIG. 10.

Step S44 corresponds to step C. The de-spread signal obtained by the first de-spreading section 22 is converted to amplitude information in the first demodulation section 23 shown in FIG. 8. FIG. 11 shows the amplitude information of the waveform of the obtained de-spread signal. Waveforms 66, 67 and 68 are amplitude information of the de-spread signals, which have been de-spread with spreading codes assigned to the ultrasonic measurement devices S1, S2 and S3, respectively.

(Steps S45 and S46)

Steps S45 and S46 correspond to step C. The amplitude ratio calculation section 25(1) of the first amplitude ratio calculation section 25 obtains a maximum peak value 69 and an S/N ratio 70 from the amplitude information 66 of the de-spread signal, which has been de-spread with the spreading code assigned to the ultrasonic measurement device S1, i.e., the selected de-spread signal. Then, based on the S/N ratio 70, it is determined whether the signal of the ultrasonic wave transmitted from the ultrasonic measurement device S1, i.e., the selected ultrasonic wave, is contained in the receive data 19, which has been cut out by the window setting section 18 (FIG. 7). If the S/N ratio 70 is less than a predetermined value, it is believed that the ultrasonic wave transmitted from the ultrasonic measurement device S1 is not contained, or that the ultrasonic wave transmitted from the ultrasonic measurement device S1 is contained but the other ultrasonic waves are so intense that the ultrasonic wave transmitted from the ultrasonic measurement device S1 cannot be detected correctly. Therefore, in such a case, subsequent processes are canceled.

(Step S47)

Step S47 corresponds to step C. In a case where the S/N ratio of the selected de-spread signal is greater than a predetermined value, the amplitude ratio calculation sections 25(2) and 25(3) of the first amplitude ratio calculation section 25 obtain maximum peak values from the amplitude information 67 and 68 of the de-spread signals, which have been de-spread with the spreading codes assigned to the ultrasonic measurement devices S2 and S3, i.e., the non-selected de-spread signals, and obtain the maximum peak amplitude ratios between the selected de-spread signal and the non-selected de-spread signals.

(Step S49)

Step S49 corresponds to step D. Based on the obtained amplitude ratios, the amplitude ratio calculation sections 25(2) and 25(3) determine threshold values for removing noise contained in the de-spread signals, which have been de-spread with the spreading codes assigned to the ultrasonic measurement devices S2 and S3, i.e., the non-selected de-spread signals. This is done by referring to the threshold value LUT 26. The relationship between the threshold value and the amplitude ratio such that the S/N ratio of the receive signal, from which the interfering signal has been removed, is greater than or equal to a predetermined value is obtained in advance and stored in the threshold value LUT 26. The method for obtaining the threshold value LUT 26 will be described below in detail.

(Step S50)

Figure 12:
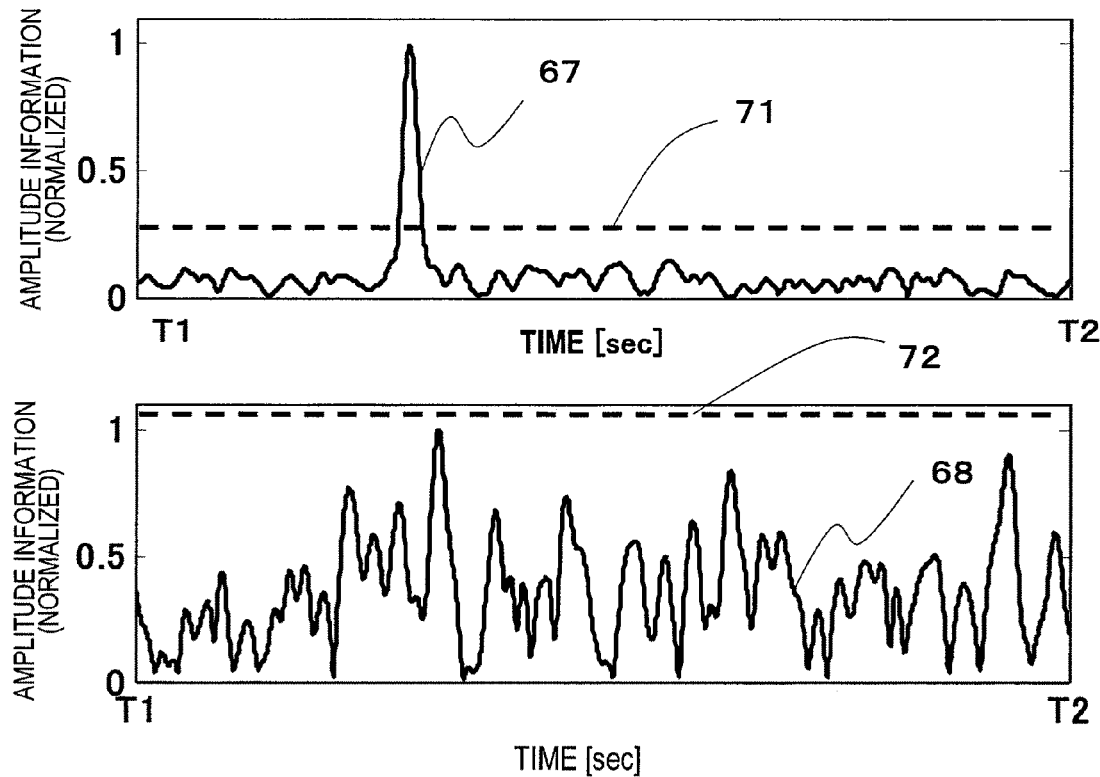
FIG. 12 A diagram showing a threshold value that is set after normalizing the waveform of amplitude information of FIG. 11.

Step S50 corresponds to step E. Using the determined threshold value, the extraction section 27 extracts a signal having an amplitude greater than or equal to the threshold value from the de-spread signals, which have been de-spread with the spreading codes assigned to the ultrasonic measurement devices S2 and S3, i.e., the non-selected de-spread signals. Specifically, the extraction section 27 produces a pulse waveform that is at "1" during a time period in which there is a waveform greater than or equal to the threshold value in the non-selected de-spread signal and at "0" during other time periods, and multiplies this with the de-spread signals shown in FIG. 10, thereby removing noise from the non-selected de-spread signals. Thus, there are produced interfering signals corresponding to the ultrasonic waves transmitted from the ultrasonic measurement devices S2 and S3. FIG. 12 shows threshold values 71 and 72 set for the amplitude information 67 and 68 of the de-spread signals, which have been de-spread with the spreading codes assigned to the ultrasonic measurement devices S2 and S3, i.e., the non-selected de-spread signals. Since a distinct peak is observed in the amplitude information 67 as shown in FIG. 12, the threshold value 71 is set so that noise levels are removed with respect to the peak. In contrast, the amplitude information 68 does not have a distinct peak, but only contains the noise component. Therefore, the threshold value 72 is set so that the entire noise component is removed.

Figure 13:
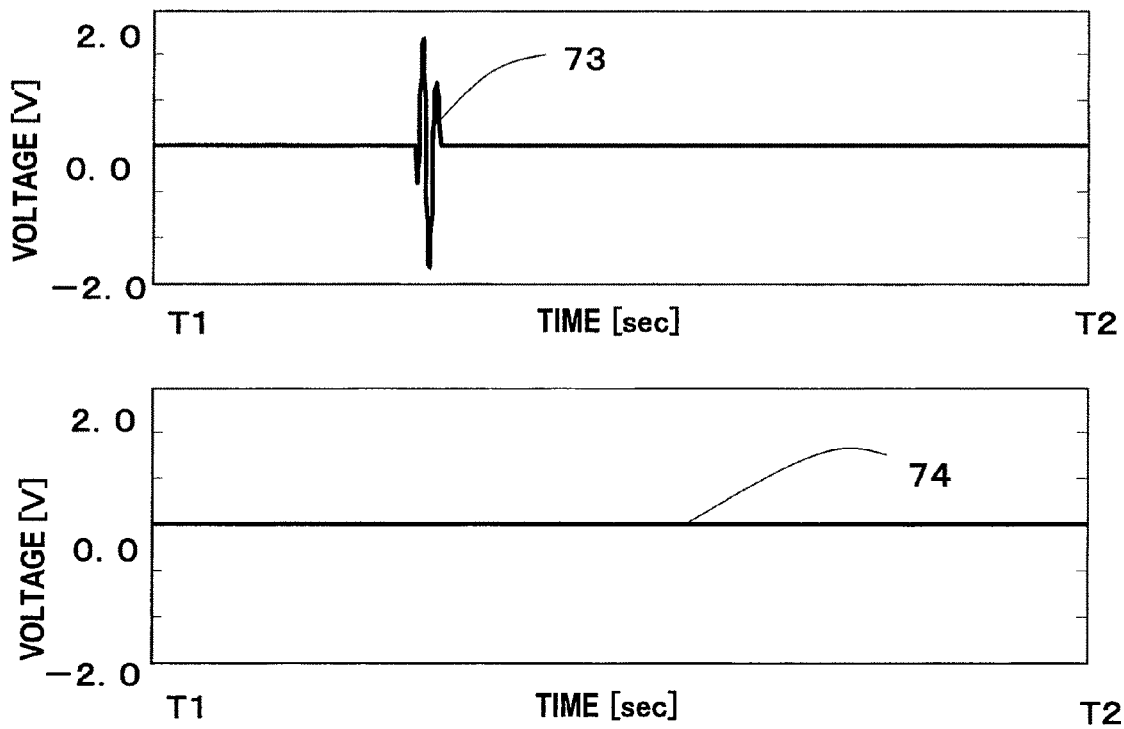
FIG. 13 A diagram showing waveforms obtained by extracting signals greater than or equal to the threshold value from interfering signals by using the threshold value shown in FIG. 11.

FIG. 13 shows waveforms 73 and 74 of the extracted interfering signals. The waveform 73 contains a signal waveform corresponding to the ultrasonic wave transmitted from the ultrasonic measurement device S2, and the noise component is completely removed. The waveform 74 contains neither a signal waveform corresponding to the ultrasonic wave transmitted from the ultrasonic measurement device S3 nor a noise component.

(Step S51)

Step S51 corresponds to step F. The first spreading section 28 spreads the produced interfering signal with a corresponding non-selected code. Specifically, the spreading section 28(1) spreads the interfering signal of the waveform 73 with the spreading code assigned to the ultrasonic measurement device S2. Similarly, the spreading section 28(2) spreads the interfering signal of the waveform 74 with the spreading code assigned to the ultrasonic measurement device S3.

(Step 52)

Step S52 corresponds to step F. The adder 29 subtracts, from the first receive signal, the interfering signals, which have been spread with the non-selected codes. At this time, the first receive signal is input to the adder 29 with the timing thereof being adjusted by the delay section 30 for synchronization with the timing of production of the spread interfering signals. Thus, there is obtained a first receive signal from which the interfering signal has been removed.

(Step S53)

Figure 14:
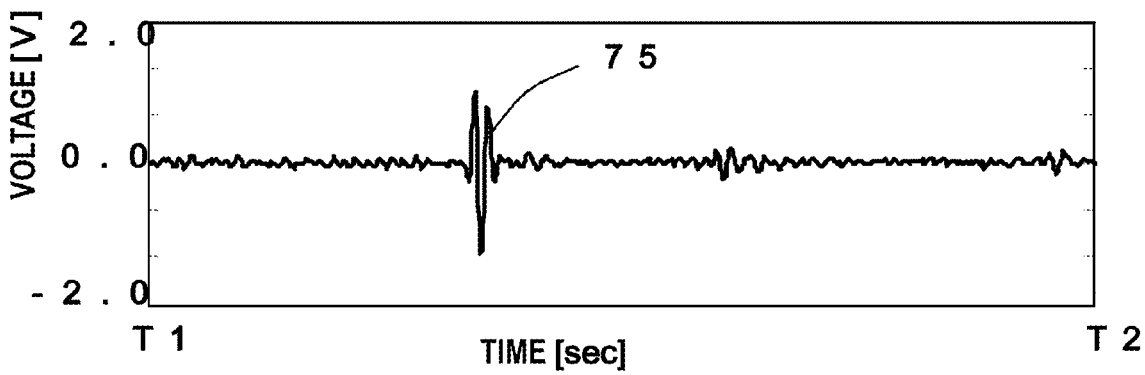
FIG. 14 A diagram showing a waveform of a signal obtained by de-spreading a signal that is obtained by removing the interfering signal shown in FIG. 12 from the receive signal.

Step S53 corresponds to step G. The re-de-spreading section 31 de-spreads the first receive signal from which the interfering signal has been removed with the selected code. That is, the first receive signal from which the interfering signal has been removed is de-spread with the selected code using the spreading code assigned to the ultrasonic measurement device S1, thereby obtaining a first de-spread signal. FIG. 14 shows the waveform 75 of the first de-spread signal obtained from the re-de-spreading section 31. The S/N ratio is improved as compared with the waveform 61 of FIG. 10, which is obtained by de-spreading the receive signal with the spreading code assigned to the ultrasonic measurement device S1 without removing interfering signals.

(Step S54)

Step S54 corresponds to step H. After processing the receive signals obtained from the first receiver 13(1) and the second receiver 13(2) by the procedure of steps S41 to S53 to obtain the first and second de-spread signals, the distance/direction calculating section 21 calculates the points in time at which the first and second de-spread signals arrive at the first receiver 13(1) and the second receiver 13(2), respectively. Thus, at least one of the propagation distance and the propagation direction is calculated as described above.

Next, the method for obtaining the threshold value LUT 26 will be described. Ultrasonic waves attenuate as they propagate through the air. The rate of attenuation varies depending on the frequency, and the rate of attenuation is greater as the frequency is higher. Thus, as the propagation path is longer, higher frequency components attenuate first.

As shown in FIG. 3, portions of the spread signal where the codes "1" and "0" transition to "0" and "1", respectively, are formed by high frequency components. As the propagation path is longer, the portions of code transitions become more vague. Thus, noise increases.

The energy of an interfering signal varies depending on its propagation path. Moreover, an ultrasonic wave is also influenced by temporal changes due to fluctuations of the air (phasing). In view of these, it is not possible to uniquely determine a threshold value for removing noise components superimposed on interfering signals.

In the present embodiment, signals to be removed by the interference remover 20 are only those ultrasonic waves (direct sound waves) that have propagated directly from other ultrasonic measurement devices (herein, the ultrasonic measurement device S2 and the ultrasonic measurement device S3) to the subject ultrasonic measurement device (herein, the ultrasonic measurement device S1) without being reflected anywhere.

In order to measure the relative distance to the object or the relative direction thereof, it is necessary to detect an ultrasonic wave that has reflected at the object. However, since a reflected wave diffuses through the reflection at the object, the energy of a reflected wave is very small as compared with ultrasonic waves propagating directly from other ultrasonic measurement devices.

On the other hand, since an ultrasonic wave propagating directly without being reflected has a large energy, it undergoes only a small waveform distortion through the propagation path. Moreover, the influence of temporal changes due to fluctuations of the air is also small. Therefore, if the order used for de-spreading the ultrasonic wave is known, it is possible to predict the ideal auto-correlation value, i.e., the ratio between the peak value and noise in a case where there is no signal interference, and the cross-correlation value in a case where there is interference (see FIGS. 3 and 4). In other words, if the amplitude information of the de-spread waveform shown in FIG. 11 is available, the S/N ratio of the waveform can be predicted, and it is therefore possible to easily estimate a threshold value for removing noise.

In this example, amplitude ratios between the selected de-spread signal and the non-selected de-spread signal, and the optimal threshold value for each of the amplitude ratios, are provided in advance as the threshold value LUT 26, and the threshold value is determined referring to the lookup table from the amplitude ratio between the selected de-spread signal and the non-selected de-spread signal.

Figure 15:
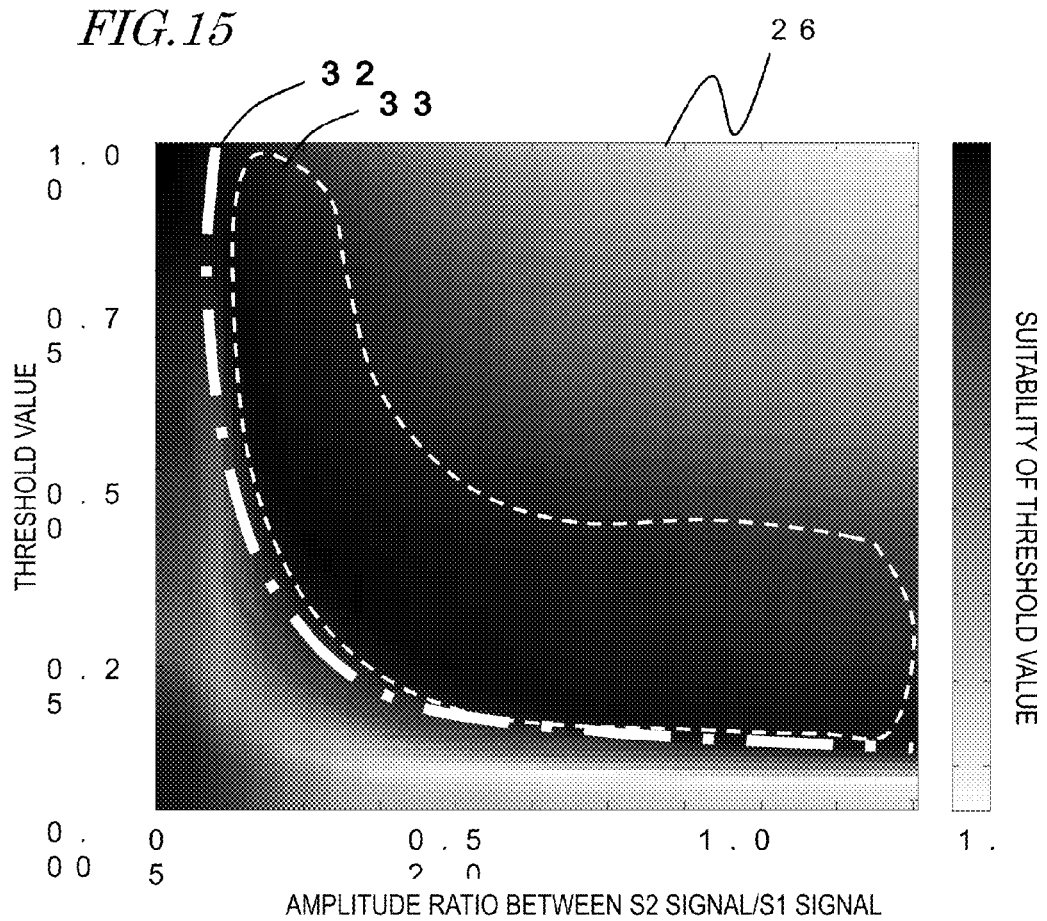
FIG. 15 A diagram showing the S/N ratio obtained by combinations of amplitude ratios and threshold values for producing a threshold value LUT.

FIG. 15 shows the relationship between the amplitude ratio between a receive signal that is transmitted from the ultrasonic measurement device S1 and received after being reflected at a wall and a receive signal that is transmitted from the ultrasonic measurement device S2 and directly received by the ultrasonic measurement device S1, i.e., the amplitude ratio between a selected de-spread signal and a non-selected de-spread signal, and the optimal threshold value for removing noise contained in the non-selected de-spread signal. This relationship is obtained by simulations and experiments.

In FIG. 15, the horizontal axis represents the amplitude ratio, and the vertical axis represents the threshold value. The threshold value is determined so that it can be applied to the amplitude information of normalized non-selected de-spread signal. Therefore, the maximum value of the threshold value is 1, in which case all the signal is removed. In FIG. 15, shading represents the S/N ratio of the signal after the interference removing process is performed. The darker the shade is, the higher the S/N ratio is. As can be seen from FIG. 15, a threshold value with which the S/N ratio is highest can be selected once the amplitude ratio is determined. In FIG. 15, a curve 32 represents the relationship between the amplitude ratio and the threshold value with which the S/N ratio is highest. An area 33 represents an area of the amplitude ratio and the threshold value where the S/N ratio is about 18 dB or more.

Therefore, if amplitude ratios and threshold values along the curve 32 of FIG. 15, which represents the relationship between the amplitude ratio and the threshold value with which the S/N ratio is highest, are used as values of the threshold value LUT 26, interfering signals can be removed most appropriately. Alternatively, amplitude ratios and threshold values satisfying the area 33 may be used as values of the threshold value LUT 26. Moreover, instead of determining a single threshold value from the threshold value LUT 26, a plurality of threshold values may be selected from a certain area, e.g., the area 33, wherein the S/N ratios of receive signals produced by removing interfering signals using these threshold values are compared with one another, and one with the highest S/N is used as the receive signal from which the interfering signal has been removed. It can be seen from FIG. 15 that the S/N ratio deteriorates significantly (lighter shade) if one selects a threshold value that is lower at all than the curve 32 representing optimal threshold values. However, the S/N ratio does not change significantly between threshold values that are slightly higher than the curve 32 representing optimal threshold values, i.e., within the area 33.

For example, in a case where the amplitude ratio between a receive signal that is transmitted from the ultrasonic measurement device S1 and received after being reflected at the object 2 and a receive signal that is transmitted from the ultrasonic measurement device S2 and received by the ultrasonic measurement device S1 is 0.4, the threshold value of a signal obtained by normalizing the amplitude information of a de-spread signal that has been de-spread with the spreading code assigned to the ultrasonic measurement device S2 is optimally 0.41, in order to remove the receive signal that is transmitted from the ultrasonic measurement device S2 and received by the ultrasonic measurement device S1.

Next, the reason why the threshold value LUT 26 obtained by simulations and experiments shows such results will be described. FIGS. 16(a) and (b) show the relationship between the amplitude information 67 of the waveform 62 that has been de-spread with the spreading code assigned to the ultrasonic measurement device S2 and the threshold value LUT 26. It is assumed that the amplitude ratio between a receive signal that is transmitted from the ultrasonic measurement device S1 and received after being reflected at the object 2 and a receive signal that is transmitted from the ultrasonic measurement device S2 and received by the ultrasonic measurement device S1 corresponds to a straight line 34 in 16(b).

It can be seen that a time width 35, which is obtained by slicing the amplitude information 67 at the threshold value, rapidly widens initially, but the widening later becomes gradual, as the threshold value is decreased from 1. The area of the threshold value where the time width 35 rapidly widens is defined as an area 36, and the area of the threshold value where the widening becomes gradual is defined as an area 37. As the threshold value is varied within the area 36 of the threshold value, the width of the extracted signal from the ultrasonic measurement device S2 varies. As the time width 35 is wider, more of the signal from the ultrasonic measurement device S2 can be extracted, thereby improving the removal rate, and increasing the S/N ratio after the interference removing process. This corresponds to the area 36 along the straight line 34 in FIG. 16(b).

As the threshold value is varied within the area 37 of FIG. 16(a), the width of the extracted signal from the ultrasonic measurement device S2 does not vary substantially. Therefore, there is substantially no change in the removal rate, and there is substantially no change in the S/N ratio after the interference removing process. This corresponds to the area 37 along the straight line 34 of FIG. 16(b).

In a case where the threshold value is set in an area 38 below the area 37 of FIG. 16(a), noise other than the signal from the ultrasonic measurement device S2 will also be extracted. This deteriorates the S/N ratio after the interference removing process. This corresponds to the area 38 along the straight line 34 of FIG. 16(b). The area 38 is a noise floor area.

Thus, the area 38 is basically proportional to the amplitude ratio between a receive signal that is transmitted from the ultrasonic measurement device S1 and received after being reflected at a wall and a receive signal that is transmitted from the ultrasonic measurement device S2 and received by the ultrasonic measurement device S1. However, in a case where the amplitude of the receive signal that is transmitted from the ultrasonic measurement device S2 and received by the ultrasonic measurement device S1 is sufficiently larger than the receive signal that is transmitted from the ultrasonic measurement device S1 and received after being reflected at a wall, noise that is not dependent on the intensity of the receive signal that is transmitted from the ultrasonic measurement device S1 and received after being reflected at a wall becomes dominant, and therefore the area 38 will be of a substantially fixed size. This corresponds to an amplitude ratio area 39 of FIG. 16(b).

If the amplitude ratio between the receive signal that is transmitted from the ultrasonic measurement device S1 and received after being reflected at a wall and the receive signal that is transmitted from the ultrasonic measurement device S2 and received by the ultrasonic measurement device S1 is in an amplitude ratio area 40 of FIG. 16(b), it is an area where the amplitude information of the waveform, which has been de-spread with the spreading code assigned to the ultrasonic measurement device S2, is lost in the noise, and the S/N ratio after the interference removing process is changed rapidly by a slight change in the threshold value. The rapid change of the S/N ratio after the interference removing process refers to a change, of which 100% means the change of the S/N ratio after the interference removing process occurring when the threshold value is changed from 0 to 1, and it is not such a significant change in practice. This is because the signal from the ultrasonic measurement device S2 is weak in the first place.

That is, in a case where the receive signal that is transmitted from the ultrasonic measurement device S2 and received by the ultrasonic measurement device S1 is sufficiently weaker than the intended signal, the results will not differ substantially whether the interference removal is performed or not.

Figure 17:
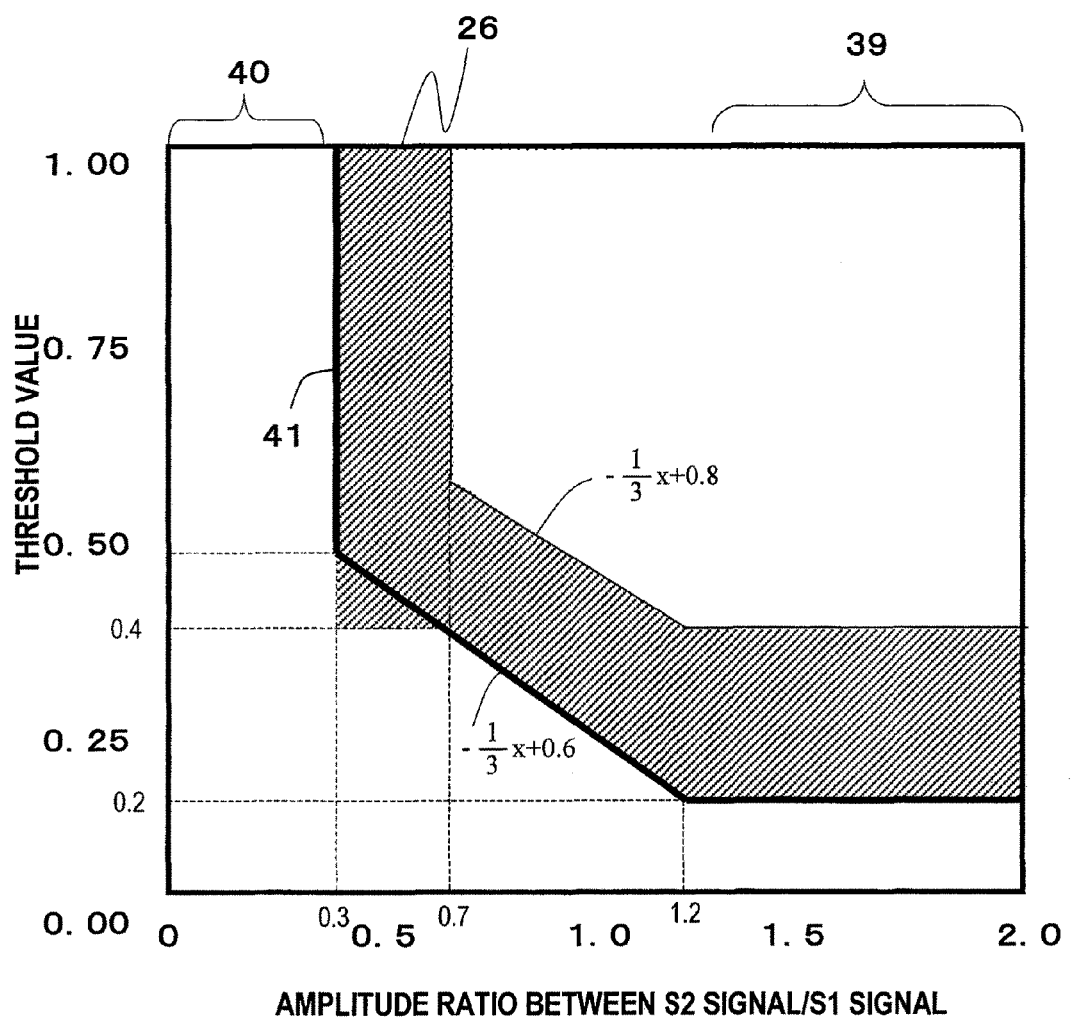
FIG. 17 A diagram showing a range of the amplitude ratio and the threshold value that is preferred as a threshold value LUT.

Based on the above, the threshold values may be fixed to a straight line 41 as shown in FIG. 17 so as to simplify the threshold value LUT 26. If the value of the amplitude ratio between the receive signal that is transmitted from the ultrasonic measurement device S1 and received after being reflected at a wall and the receive signal that is transmitted from the ultrasonic measurement device S2 and received by the ultrasonic measurement device S1 is in the amplitude ratio area 39, the extracting process is performed with a fixed threshold value, and the interference removal itself is not performed if it is in the amplitude ratio area 40. If it is in the other amplitude ratio area, the threshold value is obtained by straight line approximation. For example, where x denotes the amplitude ratio between the selected de-spread signal and the non-selected de-spread signal ([non-selected de-spread signal]/[selected de-spread signal]) and y denotes the threshold value, the amplitude ratio and the threshold value of the threshold value LUT 26 can be determined so as to satisfy Expression (2) below.

$$y=1 (0<x\leq0.3)$$

$$y=-x/3+0.6 (0.3<x\leq1.2)$$

$$y=0.2 (1.2<x) \qquad (2)$$

Alternatively, the amplitude ratios and the threshold values that are present in the hatched area in FIG. 17 may be used as the threshold value LUT 26. The hatched area is defined by an inequality below.

$$y=1 (0<x\leq 0.3)$$

$$1>y\geq 0.4 (0.3\leq x\leq 0.7)$$

$$y\geq -x/3+0.6 \text{ and } y\leq -x/3+0.8 (0.7<x<1.2)$$

$$0.2\leq y\leq 0.4 (1.2\leq x) \qquad (3)$$

Figure 18:
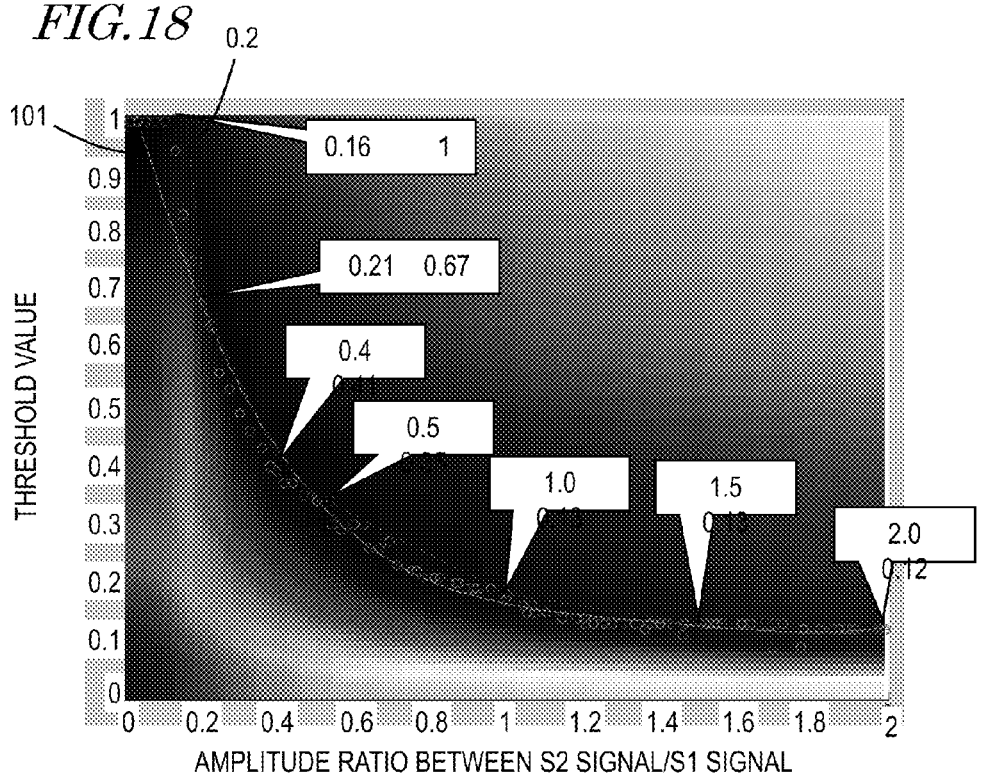
FIG. 18 A diagram showing a function that approximates a curve 32 of FIG. 15.

FIG. 18 shows a curve 101, which is an example of an approximate curve of the curve 32 of FIG. 15. In a case where the curve 32 is represented by a $4^{th}$-order approximate curve, the amplitude ratio y and the threshold value x with which the S/N ratio is highest can be represented by Expression (4) below.

$$y=0.2007x^4-1.1459x^3+2.469x^2-2.4347x+1.0748 \qquad (4)$$

Figure 19:
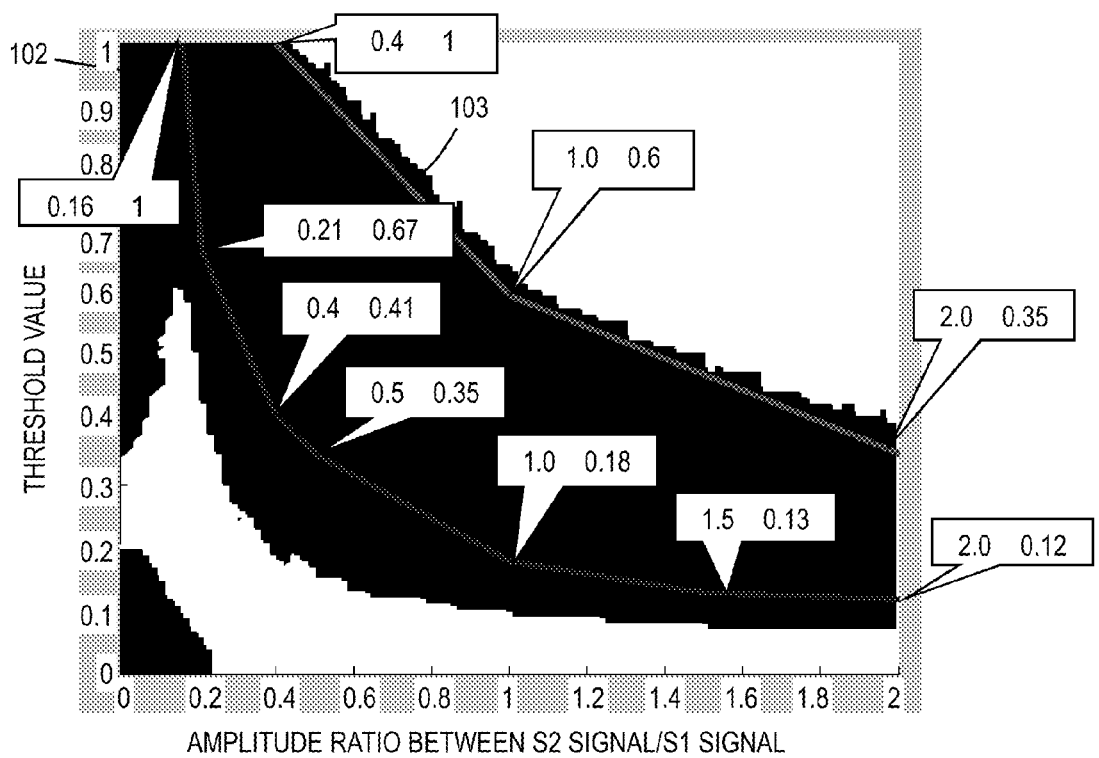
FIG. 19 A diagram showing a function that approximates an area 33 of FIG. 15.

As an evaluation of optimal combinations of amplitude ratios and threshold values, FIG. 19 shows a result obtained using the correlation values of the first receive signals and the second receive signals, from which the interfering signal has been removed, obtained by using the first and second receive signals received by the first receiver 13(1) and the second receiver 13(2). In FIG. 19, the hatched area represents combinations of the amplitude ratio and the threshold value with which the correlation value is 0.7 or more. If the S/N ratio is high, the waveforms of the first receive signal and the second receive signal, from which the interfering signal has been removed, ideally coincide with each other, yielding a high correlation value, except for the difference therebetween in the arrival time of the ultrasonic wave to be measured. Thus, the optimal relationship between the amplitude ratio and the threshold value can be obtained based on the correlation value, instead of the S/N ratio.

As shown in FIG. 19, the area where the correlation value is 0.7 or more is the area sandwiched between a zigzag line 103 and a curve 102. Specifically, it is defined by Inequality (5) below.

$$y \leq -\frac{2}{3}x+\frac{19}{15} \quad (0<x\leq 1) \qquad (5)$$
$$y \leq -0.25x+0.85 \quad (1<x\leq 2)$$
$$y \geq 0.2007x^4 - 1.1459x^3 + 2.469x^2 - 2.4347x + 1.0748 (0<x\leq 2)$$

Thus, according to the present invention, the threshold value, which is used for extraction when producing interfering signals, is varied so that the receive signal, from which the interfering signal has been removed, has a desirable S/N ratio. The threshold value is determined from the amplitude ratio between the selected de-spread signal obtained by de-spreading the receive signal using the selected code, which has been used for spreading the selected ultrasonic wave, and the non-selected de-spread signal obtained by de-spreading the receive signal using the non-selected code, which has been used for spreading the non-selected ultrasonic wave. By determining the threshold value according to the amplitude ratio, it is possible to appropriately evaluate the influence of noise contained in the non-selected de-spread signal, and to reproduce an accurate interfering signal with little influence of noise. Thus, according to the present invention, it is possible to perform optimal interference removal, and to accurately measure the distance to, or the direction of, the object.

Moreover, by obtaining, in advance, the relationship between the threshold value and the amplitude ratio such that the receive signal, from which the interfering signal has been removed, has a desirable S/N ratio, and by determining the threshold value from the amplitude ratio based on the obtained relationship or the combination of the threshold value and the amplitude ratio that satisfies the obtained relationship, it is possible to determine the optimal threshold value within a short period of time during measurement.

Experiment Example

The results of an experiment on how interfering signals can be removed by a configuration of the present embodiment will be shown.

Figure 20:
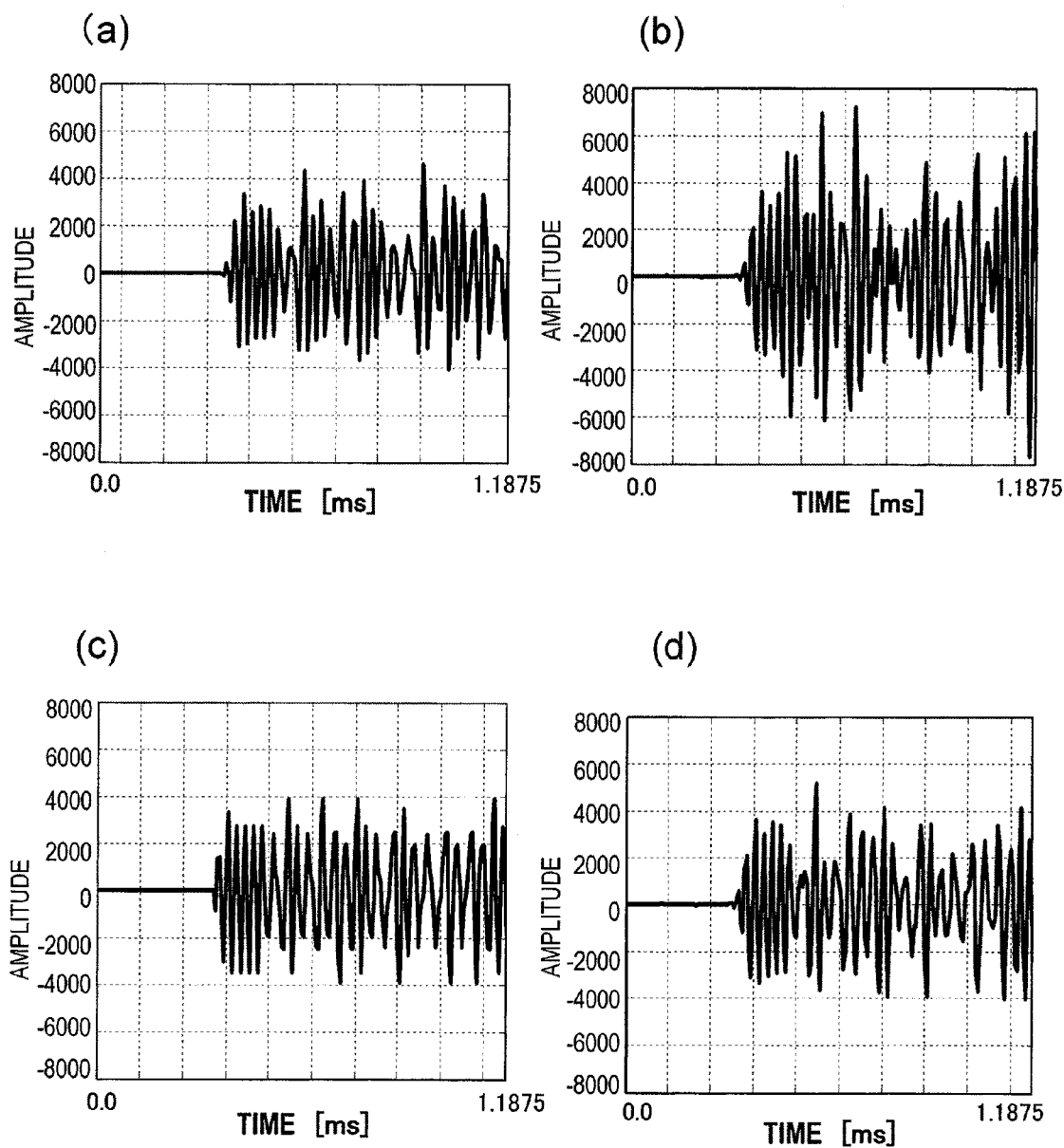
FIG. 20 (a) to (d) show experimental results according to the present embodiment, each showing a waveform before de-spreading.
Figure 22:
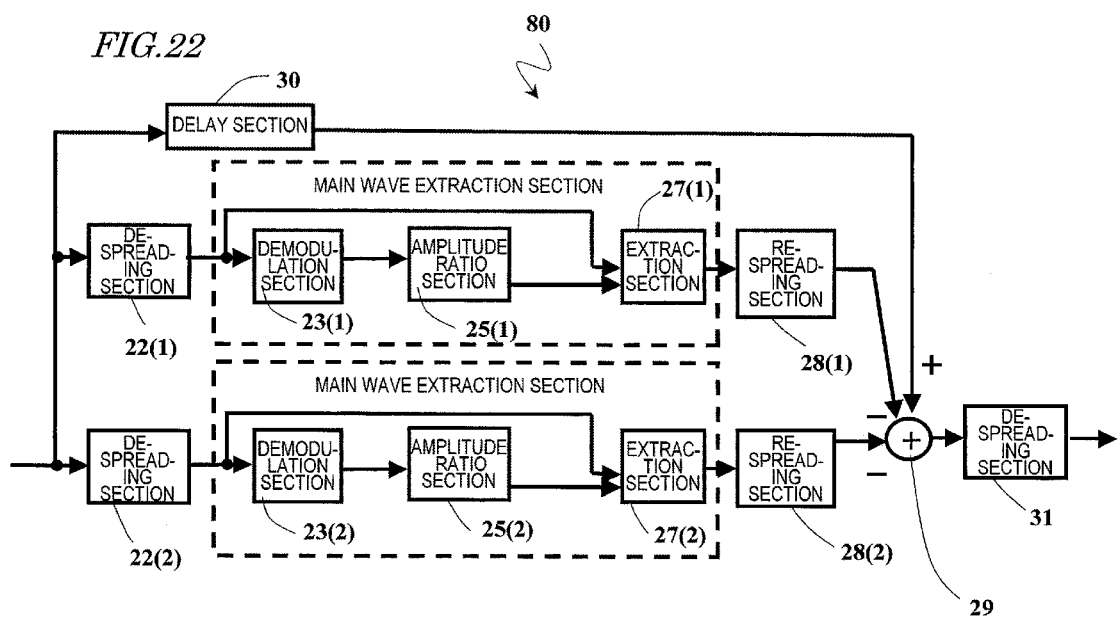
FIG. 22 A block diagram showing a basic configuration of a conventional interference removing device in the field of mobile telephones.

FIG. 20(a) shows a waveform of an ultrasonic wave that has been spread with the code assigned to the ultrasonic measurement device S1, and FIG. 20(b) shows a waveform of an ultrasonic wave obtained by combining an ultrasonic wave that has been spread with the code assigned to the ultrasonic measurement device S1 with an ultrasonic wave that has been spread with the code assigned to the ultrasonic measurement device S2.

FIG. 20(c) shows a waveform obtained by de-spreading an ultrasonic wave (the ultrasonic wave of the waveform shown in FIG. 20(b)), which is obtained by combining together the ultrasonic wave that has been spread with the code assigned to the ultrasonic measurement device S1 and the ultrasonic wave that has been spread with the code assigned to the ultrasonic measurement device S2, with the code assigned to the ultrasonic measurement device S1, thereby removing the ultrasonic wave of the ultrasonic measurement device S2 as an interfering wave. FIG. 20(d) shows a waveform obtained by removing the ultrasonic wave of the ultrasonic measurement device S2 as an interfering wave by using the device of the present embodiment.

FIGS. 21(a), 21(b) and 21(c) show waveforms obtained by de-spreading signals of the waveforms shown in FIGS. 20(a), 20(c) and 20(d), respectively, with the code assigned to the ultrasonic measurement device S1, and cutting out a portion of the obtained signals.

As is clear from FIG. 21(a), in a case where there is no interfering ultrasonic wave, a waveform with a high SN ratio can be obtained by de-spreading.

In contrast, in a case where there are interfering ultrasonic waves as shown in FIGS. 21(b) and 21(c), the SN ratio of the waveform obtained by de-spreading is lowered. However, as is clear from a comparison between the P portion shown in FIG. 21(b) and a Q portion shown in FIG. 21(c), the amplitude of noise except around t=0.3 millisecond is smaller in the present embodiment, indicating that the SN ratio is improved.

Note that the method for removing interfering signals used in the ultrasonic measurement device and the ultrasonic measurement method of the present invention can suitably be used in applications other than the distance/direction measurement using ultrasonic waves. Specifically, the method for removing interfering signals used in the present invention can be applied to indoor sound source localization, ultrasonic tags, etc., in which information is transmitted using an ultrasonic wave as a carrier. While direction can be measured by receiving an ultrasonic wave with two wave-receivers in the present embodiment, if it is not necessary to measure direction, the ultrasonic measurement device may include one wave-receiver and one interference removing section.

INDUSTRIAL APPLICABILITY

With the ultrasonic measurement device and the ultrasonic measurement method of the present invention, it is possible to measure distance or direction with a high precision by performing optimal interference removal even in an environment where there are a plurality of ultrasonic measurement devices. Particularly, it is possible to perform high-precision measurement even if the measurement environment varies, and it can suitably be used in a range finder or a direction finder mounted on a self-propelled robot. For example, it can suitably be used in transportation robots, etc., in indoor environments such as train stations and airports.

The invention claimed is:

1. An ultrasonic measurement method for measuring at least one of a propagation distance and a propagation direction of a selected ultrasonic wave among a plurality of ultrasonic waves that have been spectrum-spread with different codes, comprising:
   a step (A) of receiving the plurality of ultrasonic waves that have been spectrum-spread with different codes by first and second wave-receivers to produce first and second receive signals;
   a step (B) of de-spreading the first and second receive signals respectively with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal for the first and second receive signals, respectively;
   a step (C) of obtaining an amplitude ratio between the selected de-spread signal and the at least one non-selected de-spread signal for each of the first and second receive signals;
   a step (D) of determining at least one threshold value based on the amplitude ratio for each of the first and second receive signals;
   a step (E) of extracting a signal having an amplitude greater than or equal to the threshold value from the at least one non-selected de-spread signal by using the threshold value for each of the first and second receive signals to thereby produce at least one interfering signal;
   a step (F) of, for each of the first and second receive signals, spreading the at least one interfering signal with a corresponding non-selected code and then removing the at least one interfering signal from the first and second receive signals to thereby produce first and second receive signals from which the interfering signal has been removed;
   a step (G) of de-spreading the first and second receive signals from which the interfering signal has been removed each with the selected code to thereby obtain first and second de-spread signals from which the interfering signal has been removed; and
   a step (H) of calculating at least one of the propagation distance and the propagation direction of the selected ultrasonic wave based on points in time at which the first and second de-spread signals from which the interfering signal has been removed arrive at the first and second wave-receivers, wherein
   the step (D) includes obtaining in advance a relationship between a threshold value and the amplitude ratio such that an S/N ratio of the receive signal from which the interfering signal has been removed is greater than or equal to a predetermined value, and determining a threshold value for an amplitude ratio based on the relationship obtained in advance.

2. The ultrasonic measurement method of claim 1, wherein the step (E) includes extracting a signal having an amplitude greater than or equal to the threshold value based on normalized amplitude information of the at least one non-selected de-spread signal; and
the relationship is as follows:

$$y=1(0<x<0.3)$$

$$1>y\geq 0.4(0.3\leq x\leq 0.7)$$

$$y\geq -x/3+0.6 \text{ and } y\leq -x/3+0.8(0.7<x<1.2)$$

$$0.2\leq y\leq 0.4(1.2\leq x)$$

where x and y denote the amplitude ratio and the threshold value, respectively.

3. The ultrasonic measurement method of claim 1, wherein the codes are M-sequence pseudo-spreading codes.

4. The ultrasonic measurement method of claim 1, wherein a 0-degree phase and a 180-degree phase of the ultrasonic wave are allocated to the codes.

5. An ultrasonic measurement method for measuring at least one of a propagation distance and a propagation direction of a selected ultrasonic wave among a plurality of ultrasonic waves that have been spectrum-spread with different codes, comprising:
   a step (A) of receiving the plurality of ultrasonic waves that have been spectrum-spread with different codes by first and second wave-receivers to produce first and second receive signals;
   a step (B) of de-spreading the first and second receive signals respectively with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal for the first and second receive signals, respectively;
   a step (C) of obtaining an amplitude ratio between the selected de-spread signal and the at least one non-selected de-spread signal for each of the first and second receive signals;
   a step (D) of determining at least one threshold value based on the amplitude ratio for each of the first and second receive signals;
   a step (E) of extracting a signal having an amplitude greater than or equal to the threshold value from the at least one non-selected de-spread signal by using the threshold value for each of the first and second receive signals to thereby produce at least one interfering signal;
   a step (F) of, for each of the first and second receive signals, spreading the at least one interfering signal with a corresponding non-selected code and then removing the at least one interfering signal from the first and second receive signals to thereby produce first and second receive signals from which the interfering signal has been removed;
   a step (G) of de-spreading the first and second receive signals from which the interfering signal has been removed each with the selected code to thereby obtain first and second de-spread signals from which the interfering signal has been removed; and
   a step (H) of calculating at least one of the propagation distance and the propagation direction of the selected ultrasonic wave based on points in time at which the first and second de-spread signals from which the interfering signal has been removed arrive at the first and second wave-receivers, wherein the step (D) includes obtaining in advance a relationship between a threshold value and the amplitude ratio where a correlation value between receive signals obtained from at least two wave-receivers from which the interfering signal has been removed is greater than or equal to a predetermined value, and determining a threshold value for an amplitude ratio based on the relationship obtained in advance.

6. The ultrasonic measurement method of claim 5, wherein the step (E) includes extracting a signal having an amplitude greater than or equal to the threshold value based on normalized amplitude information of the at least one non-selected de-spread signal; and the relationship is as follows:

$$y \leq -2/3x + 19/15 \ (0 < x \leq 1)$$

$$y \leq -0.25x + 0.85 \ (1 < x \leq 2)$$

$$y \leq 0.2007x^4 - 1.1459x^3 + 2.469x^2 - 2.4347x + 1.0748 \ (0 < x \leq 2)$$

where x and y denote the amplitude ratio and the threshold value, respectively.

7. An ultrasonic measurement device for measuring at least one of a propagation distance and a propagation direction of a selected ultrasonic wave among a plurality of ultrasonic waves that have been spectrum-spread with different codes, comprising:

first and second wave-receivers for receiving the plurality of ultrasonic waves that have been spectrum-spread with different codes to produce first and second receive signals, respectively;

first and second de-spreading sections for de-spreading the first and second receive signals respectively with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal, respectively;

first and second amplitude ratio calculation sections for obtaining an amplitude ratio between the selected de-spread signal and the at least one non-selected de-spread signal;

first and second threshold value determination sections for determining at least one threshold value based on the amplitude ratio;

first and second extraction sections for extracting a signal having an amplitude greater than or equal to the threshold value from the at least one non-selected de-spread signal by using the threshold value to thereby produce at least one interfering signal;

first and second spreading sections for spreading the at least one interfering signal with a corresponding non-selected code;

first and second interfering signal removing sections for removing the at least one spread interfering signal from each of the first and second receive signals to thereby produce first and second receive signals from which the interfering signal has been removed, respectively;

first and second re-de-spreading sections for de-spreading the first and second receive signals from which the interfering signal has been removed with the selected code to thereby produce the first and second de-spread signals from which the interfering signal has been removed, respectively; and a distance/direction calculating section for calculating at least one of the propagation distance and the propagation direction of the selected ultrasonic wave based on points in time at which the first and second de-spread signals from which the interfering signal has been removed arrive at the first and second wave-receivers, wherein each of the first and second threshold value determination sections includes a storage section, and the storage section stores threshold values and corresponding amplitude ratios, obtained in advance, such that an S/N ratio of the first or second receive signal from which the interfering signal has been removed is greater than or equal to a predetermined value; and the amplitude ratio is received from the first and second amplitude ratio calculation sections so as to output a threshold value stored in the storage section corresponding to the amplitude ratio.

8. The ultrasonic measurement device of claim 7, wherein the first and second extraction sections extract a signal having an amplitude greater than or equal to the threshold value based on normalized amplitude information of the at least one non-selected de-spread signal; and the amplitude ratios and the threshold values stored in the storage section satisfy a relationship:

$$y = 1 (0 < x < 0.3)$$

$$1 > y \geq 0.4 (0.3 \leq x \leq 0.7)$$

$$y \leq -x/3 + 0.6 \text{ and } y \leq -x/3 + 0.8 (0.7 < x < 1.2)$$

$$0.2 \leq y \leq 0.4 (1.2 \leq x)$$

where x and y denote the amplitude ratio and the threshold value, respectively.

9. The ultrasonic measurement device of claim 7, wherein the codes are M-sequence pseudo-spreading codes.

10. The ultrasonic measurement device of claim 7, wherein a 0-degree phase and a 180-degree phase of the ultrasonic wave are allocated to the codes.

11. An ultrasonic measurement device for measuring at least one of a propagation distance and a propagation direction of a selected ultrasonic wave among a plurality of ultrasonic waves that have been spectrum-spread with different codes, comprising:

first and second wave-receivers for receiving the plurality of ultrasonic waves that have been spectrum-spread with different codes to produce first and second receive signals, respectively;

first and second de-spreading sections for de-spreading the first and second receive signals respectively with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal, respectively;

first and second amplitude ratio calculation sections for obtaining an amplitude ratio between the selected de-spread signal and the at least one non-selected de-spread signal;

first and second threshold value determination sections for determining at least one threshold value based on the amplitude ratio;

first and second extraction sections for extracting a signal having an amplitude greater than or equal to the threshold value from the at least one non-selected de-spread signal by using the threshold value to thereby produce at least one interfering signal;

first and second spreading sections for spreading the at least one interfering signal with a corresponding non-selected code;

first and second interfering signal removing sections for removing the at least one spread interfering signal from each of the first and second receive signals to thereby produce first and second receive signals from which the interfering signal has been removed, respectively;

first and second re-de-spreading sections for de-spreading the first and second receive signals from which the interfering signal has been removed with the selected code to thereby produce the first and second de-spread signals from which the interfering signal has been removed, respectively; and a distance/direction calculating section for calculating at least one of the propagation distance and the propagation direction of the selected ultrasonic wave based on points in time at which the first and second de-spread signals from which the interfering signal has been removed arrive at the first and second wave-receivers, wherein each of the first and second threshold value determination sections includes a storage section, and the storage section stores threshold values and corresponding amplitude ratios such that a correlation value between the first and second receive signals from which the interfering signal has been removed is greater than or equal to a predetermined value; and the amplitude ratio is received from the first and second amplitude ratio calculation sections so as to output a threshold value stored in the storage section corresponding to the amplitude ratio.

12. The ultrasonic measurement device of claim 11, wherein the first and second extraction sections extract a signal having an amplitude greater than or equal to the threshold value based on normalized amplitude information of the at least one non-selected de-spread signal; and the amplitude ratios and the threshold values stored in the storage section satisfy a relationship:

$$y \leq -2/3x + 19/15 \ (0 < x \leq 1)$$

$$y \leq -0.25x + 0.85 \ (1 < x \leq 2)$$

$$y \leq 0.2007x^4 - 1.1459x^3 + 2.469x^2 - 2.4347x + 1.0748 \ (0 < x \leq 2)$$

where x and y denote the amplitude ratio and the threshold value, respectively.

13. An ultrasonic measurement device for measuring at least one of a propagation distance and a propagation direction of a selected ultrasonic wave among a plurality of ultrasonic waves that have been spectrum-spread with different codes, comprising:

a wave-receiver for receiving the plurality of ultrasonic waves that have been spectrum-spread with different codes to produce a receive signal;

a de-spreading section for de-spreading the receive signal with a selected code having been used for spreading the selected ultrasonic wave and a corresponding non-selected code having been used for spreading at least one non-selected ultrasonic wave which has not been selected from among the plurality of ultrasonic waves to thereby produce a selected de-spread signal and at least one non-selected de-spread signal, respectively;

an amplitude ratio calculation section for obtaining an amplitude ratio between the selected de-spread signal and the at least one non-selected de-spread signal;

a threshold value determination section for determining at least one threshold value based on the amplitude ratio;

an extraction section for extracting a signal having an amplitude greater than or equal to the threshold value from the at least one non-selected de-spread signal by using the threshold value to thereby produce at least one interfering signal;

a spreading section for spreading the at least one interfering signal with a corresponding non-selected code;

an interfering signal removing section for removing the at least one spread interfering signal from the receive signal to thereby produce a receive signal from which the interfering signal has been removed;

a re-de-spreading section for de-spreading the receive signal from which the interfering signal has been removed with the selected code to thereby produce a de-spread signal from which the interfering signal has been removed; and a distance/direction calculating section for calculating the propagation distance of the selected ultrasonic wave based on a point in time at which the de-spread signal from which the interfering signal has been removed arrives at the wave-receiver.

* * * * *

UNITED STATES PATENT AND TRADEMARK OFFICE
CERTIFICATE OF CORRECTION

PATENT NO.       : 8,090,547 B2
APPLICATION NO.  : 12/517377
DATED            : January 3, 2012
INVENTOR(S)      : Takehiko Suginouchi, Yong Wang and Masahiko Hashimoto It is certified that error appears in the above-identified patent and that said Letters Patent is hereby corrected as shown below:

Column 27, lines 25-26 and Column 30, lines 6-7,
"$y \leq 0.2007x^4 - 1.1459x^3 + 2.469x^2 - 2.4347x + 1.0748 (0 < x \leq 2)$" should read
-- $y \geq 0.2007x^4 - 1.1459x^3 + 2.469x^2 - 2.4347x + 1.0748 (0 < x \leq 2)$ --.

Signed and Sealed this
Twelfth Day of June, 2012

David J. Kappos
*Director of the United States Patent and Trademark Office*